(12) United States Patent
Futterer

(10) Patent No.: US 9,395,690 B2
(45) Date of Patent: Jul. 19, 2016

(54) BEAM DIVERGENCE AND VARIOUS COLLIMATORS FOR HOLOGRAPHIC OR STEREOSCOPIC DISPLAYS

(75) Inventor: Gerald Futterer, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 542 days.

(21) Appl. No.: 13/808,379

(22) PCT Filed: Apr. 11, 2011

(86) PCT No.: PCT/EP2011/055593
§ 371 (c)(1),
(2), (4) Date: Mar. 18, 2013

(87) PCT Pub. No.: WO2012/004016
PCT Pub. Date: Jan. 12, 2012

(65) Prior Publication Data
US 2013/0170004 A1    Jul. 4, 2013

(30) Foreign Application Priority Data

Jul. 6, 2010   (DE) .......................... 10 2010 031 024
Oct. 29, 2010  (DE) .......................... 10 2010 043 191
Mar. 25, 2011  (WO) ................. PCT/EP2011/054660

(51) Int. Cl.
*G03H 1/10* (2006.01)
*G02B 5/32* (2006.01)
(Continued)

(52) U.S. Cl.
CPC ........... *G03H 1/0891* (2013.01); *G03H 1/2205* (2013.01); *G03H 1/2294* (2013.01);
(Continued)

(58) Field of Classification Search
CPC . G03H 1/2294; G03H 1/2286; G03H 1/0005; G03H 1/2205; G03H 1/2202; G03H 1/0443; G03H 2223/16; G03H 1/0248; G03H 2001/2226; G03H 1/10; G03H 2210/22; G03H 2225/22; G03H 2225/30; G02B 5/0252

USPC ........ 359/9, 10, 11, 15, 19, 21, 27, 34, 32, 35
See application file for complete search history.

(56) References Cited

U.S. PATENT DOCUMENTS 5,355,187 A * 10/1994 Ogino .................. G02B 3/0043
                                                                348/E9.027
5,940,050 A    8/1999  Joubert et al.
(Continued)

FOREIGN PATENT DOCUMENTS

CA      2 766 694 A1   12/2010
DE    100 53 880 A1    8/2001
(Continued)

OTHER PUBLICATIONS

International Search Report, dated Nov. 2, 2011, and its English translation, issued in priority International Application No. PCT/EP2011/055593.
(Continued)

*Primary Examiner* — Jade R Chwasz
(74) *Attorney, Agent, or Firm* — Saul Ewing LLP

(57) ABSTRACT

A holographic display with an illumination device, an enlarging unit and a light modulator. The illumination device includes at least one light source and a light collimation unit, the light collimation unit collimates the light of the at least one light source and generates a light wave field of the light that is emitted by the light source with a specifiable angular spectrum of plane waves, the enlarging unit is disposed downstream of the light collimation unit, seen in the direction of light propagation, where the enlarging unit comprises includes a transmissive volume hologram realizing an anamorphic broadening of the light wave field due to a transmissive interaction of the light wave field with the volume hologram, and the light modulator is disposed upstream or downstream of the anamorphic enlarging unit, seen in the direction of light propagation.

43 Claims, 14 Drawing Sheets

(51) Int. Cl.
    *G03H 1/22*     (2006.01)
    *G03H 1/08*     (2006.01)
    *F21V 8/00*         (2006.01)
    *G02F 1/1335*       (2006.01)
    *G03H 1/30*         (2006.01)
    *G02F 1/1362*       (2006.01)

(52) U.S. Cl.
    CPC ......... *G02B6/0046* (2013.01); *G02F 1/133524* (2013.01); *G02F 1/133621* (2013.01); *G02F 1/136277* (2013.01); *G02F 2201/02* (2013.01); *G03H 1/2286* (2013.01); *G03H 1/30* (2013.01); *G03H 2001/2236* (2013.01); *G03H 2001/2239* (2013.01); *G03H 2001/2242* (2013.01); *G03H 2001/2292* (2013.01); *G03H 2222/22* (2013.01); *G03H 2222/34* (2013.01); *G03H 2223/12* (2013.01); *G03H 2223/14* (2013.01); *G03H 2223/19* (2013.01); *G03H 2225/11* (2013.01)

(56) References Cited

U.S. PATENT DOCUMENTS

| | | | |
|---|---|---|---|
| 6,069,728 | A | 5/2000 | Huignard et al. |
| 7,839,548 | B2 | 11/2010 | Schwerdtner |
| 2003/0076423 | A1* | 4/2003 | Dolgoff .................... 348/222.1 |
| 2005/0089277 | A1 | 4/2005 | Ishida |
| 2006/0250671 | A1 | 11/2006 | Schwerdtner et al. |
| 2006/0279567 | A1 | 12/2006 | Schwerdtner et al. |
| 2007/0252954 | A1 | 11/2007 | McGuire, Jr. et al. |
| 2008/0198431 | A1 | 8/2008 | Schwerdtner |
| 2010/0259804 | A1 | 10/2010 | Buschbeck et al. |
| 2011/0216407 | A1 | 9/2011 | Olaya |
| 2011/0235145 | A1 | 9/2011 | Futterer et al. |
| 2012/0092735 | A1 | 4/2012 | Futterer et al. |

FOREIGN PATENT DOCUMENTS

| | | |
|---|---|---|
| EP | 0311843 A2 | 4/1989 |
| WO | 95/12286 | 5/1995 |
| WO | 02/31405 A2 | 4/2002 |
| WO | 02/082168 A1 | 10/2002 |
| WO | 2004/044659 A2 | 5/2004 |
| WO | 2004/109380 A1 | 12/2004 |
| WO | 2005/080861 A1 | 9/2005 |
| WO | 2006/066919 A1 | 6/2006 |
| WO | 2006/119760 A2 | 11/2006 |
| WO | 2009/071546 A1 | 6/2009 |
| WO | 2010/052304 A1 | 5/2010 |
| WO | 2010/066700 A2 | 6/2010 |
| WO | 2010/149587 A2 | 12/2010 |
| WO | 2010/149588 A1 | 12/2010 |

OTHER PUBLICATIONS

"Untersuchung der raumlichen Koharenz einer ausgedehnten Lichtquelle," Handblatter Physik-Optik-Wellenoptik-Beugung, Oct. 6, 2011, pp. 1-4, XP55008870; retrieved from the Internet: URL:http://www.ld-didactic.de/literatur/hb/d/p5/p5319_d.pdf [retrieved on Jan. 2, 2013].

* cited by examiner

BEAM DIVERGENCE AND VARIOUS COLLIMATORS FOR HOLOGRAPHIC OR STEREOSCOPIC DISPLAYS

CROSS REFERENCE TO RELATED APPLICATIONS

This application claims the priority of PCT/EP2011/055593, filed on Apr. 11, 2011, which claims priority to German application No. 10 2010 031 024.7, filed Jul. 6, 2010; German Application No. 10 2010 043 191.5, filed Oct. 29, 2010, and International Application No. PCT/EP2011/054660, filed Mar. 25, 2011, the entire contents of all of which are hereby incorporated in total by reference.

BACKGROUND OF THE INVENTION

The present invention relates to a holographic display with an illumination device, an enlarging unit and a light modulator. The holographic display serves to present two-dimensional and/or three-dimensional image information.

There are two major problems one faces when realising holographic displays with large screen size:

If a large-area light modulator, e.g. having a diagonal measurement of 24", is used to encode the hologram, then this large area of the light modulator must be illuminated uniformly with sufficiently coherent light.

In contrast, if a small light modulator is combined with a projection arrangement, then the device will be deeper than 1 m if it has the same screen size of 24" and if conventional optical means such as lenses and mirrors are used.

It should be possible to solve the first problem with a large illumination device that is as flat as possible. The second problem can only be solved if other means than conventional optical means are used to enlarge the illumination device and/or the light modulator.

A holographic projection display is disclosed for example in document WO 2006/119760 A2. In that document, a light modulator with a small surface and high resolution, on which a hologram is encoded, is imaged in an enlarged manner with the help of an arrangement of lenses and mirrors onto a lens or concave mirror which serves as a screen and reconstructed in a space which stretches between the screen and a viewing window which is situated in the Fourier plane of the screen. Thanks to the enlarged imaging of the hologram onto the screen, that arrangement has the advantage that the reconstruction space is enlarged too, so that much larger objects can be reconstructed than in conventional holographic arrangements. However, this goes along with the disadvantage that the optical arrangement is rather voluminous and particularly long in the axial direction, so that it can hardly be used as a holographic desktop display because of its large depth.

In the projection display which is disclosed in document US 2007/252956 A, a small light modulator is illuminated by a relatively small illumination device and projected in an enlarged manner onto a screen with the help of an extra-axially disposed holographic mirror element. It is an advantage of that arrangement that the axial dimension of the entire system is shortened because of the oblique optical path. However, the arrangement is still too voluminous to be used as a holographic desktop display.

Document WO 2002/082168 A discloses a flat projection display which combines a one-dimensional and a two-dimensional grating for light deflection. The virtual image of a video projector is guided through a rod-shaped grating body in one direction, and it is then guided through a plate-shaped grating body in a second direction which is perpendicular to the first one. In one embodiment, the gratings are made of glass strips which are joined in layers at an angle of 45° to the surface of the display, each of which deflecting the light at right angles to the direction of incidence. However, the image of the light modulator is thereby rather multiplied than enlarged, and an observer who looks at the surface of the plate-shaped grating body in the normal direction sees a two-dimensional arrangement of one and the same modulator image. A holographic projection display where the encoding surface of the light modulator is actually enlarged cannot be realised with such an arrangement though.

In document WO 2002/31405 A, a collimated pencil of light rays with rectangular cross-section, which is for example emitted by a light modulator, is broadened in two perpendicular directions in that it falls at a small angle on a one-dimensional surface that is not reflecting like a mirror and on a two-dimensional surface that is not reflecting like a mirror one after another. The two-dimensional broadening is achieved through the flat, "grazing" incidence, and the surfaces have such texture that they reflect the light beams into the desired direction, that is perpendicular to the direction of incidence in this case. This is realised with the help of two-dimensional diffraction gratings or holographic surface gratings. In that arrangement, the cross-sectional area of the incident light wave field is truly enlarged, but there is no mention of defined amplitude and phase modulation of the pencils of light rays when they are reflected by the diffraction gratings, which would, however, be essential in the context of holographic reconstruction of three-dimensional scenes.

SUMMARY OF THE INVENTION

It is thus the object of the present invention to provide a holographic display with an illumination device which has an area that is as large as possible while having a depth that is as little as possible and which involves a minimum number of primary light sources only. It is a further object of the present invention to enlarge a holographically encoded light modulator that is as small as possible to a sufficiently large size without thereby considerably increasing the depth of the arrangement. In either case, the angular spectrum of plane waves emitted by the illumination device and their coherence properties shall satisfy the requirements of a holographic or mixed holographic and stereoscopic representation of objects.

These objects are solved according to this invention by the features of claim 1. Further preferred embodiments and continuations of the present invention are defined in the dependent claims.

The holographic display according to this invention comprises an illumination device, an enlarging unit and a light modulator. The illumination device comprises at least one light source and a light collimation unit. The light collimation unit is designed such that it collimates the light that is emitted by the at least one light source and generates a light wave field of the light that is emitted by the light source with a specifiable angular spectrum of plane waves. The enlarging unit is disposed downstream of the light collimation unit, seen in the direction of light propagation. The enlarging unit comprises a transmissive volume hologram which is designed and disposed such that an anamorphic broadening of the light wave field can be realised due to a transmissive interaction of the light wave field with the volume hologram (VH). Here, the light collimation unit and the enlarging unit can preferably be used each for itself in a holographic or stereoscopic or autostereoscopic display. The light collimation unit and the enlarging unit—then as a collimating and enlarging module—can provide a broadened collimated light wave field for such a display according to this invention. In the context of the present invention, anamorphic broadening means in particular a beam broadening or enlargement of an incident light beam or light wave field without the provision of an intermediate optical image.

The light modulator for encoding the hologram information can be disposed upstream or downstream of the anamorphic enlarging unit, seen in the direction of light propagation.

The light wave field coming from the light collimation unit can hit the volume hologram at a specifiable angle of incidence, which should not be smaller than 70°. The angle of incidence here relates to the surface normal of the volume hologram and takes into account a possible difference in the refractive indices of the optical media in front of and behind the volume hologram.

The thickness of the volume hologram is chosen such that the light wave field shows an angular distribution of wave vectors and that the maximum deviation of the angle distribution of wave vectors of the light wave field does not exceed a value of $1/20°$ in at least one direction. The wave vector describes the direction of propagation of the waves of the light wave field.

The difference in optical path length of the light beams of the enlarged light wave field between two defined points on the light modulator shall not exceed a given value on the encoding surface of the light modulator at a given coherence length of the light. This means that the difference in optical path length between two arbitrary light beams which pass through a given sub-region of the light modulator, which can for example correspond with a sub-hologram, shall be small enough that these light beams are still capable of generating interference. A definition of a sub-hologram is given in document WO 2006/066919 A1. Insofar, it is made sure with a thus defined coherence length of the used light that constructive and destructive interference is still possible in a display based on document WO 2006/066919 A1, so that three-dimensional scenes can be presented holographically to an observer with the display.

The enlarging unit can comprise a further volume hologram disposed more downstream in the direction of light propagation, where the volume holograms of the enlarging unit are designed and disposed such that the light can be deflected into two different directions, where the light modulator is disposed upstream or downstream of the further volume hologram, seen in the direction of light propagation. According to this embodiment, the first volume hologram serves to broaden or enlarge in a first direction the light wave field which is collimated by the light collimation unit. The further (or second) volume hologram, which is disposed downstream of the first volume hologram, serves to broaden or enlarge in a second direction the light wave field which has been enlarged in the first direction by the first volume hologram. Thereby, for example just one primary light source can preferably illuminate a large area or region substantially homogeneously, where the enlarging unit preferably takes very little space.

The two volume holograms can be arranged such that they broaden the light wave field with the defined angular spectrum of plane waves anamorphically in two substantially perpendicular directions, i.e. with a different enlargement factor in each direction.

The used volume holograms are preferably off-axis volume holograms, where object beam and reference beam do not lie on the same axis.

A laser, a laser diode, LED or OLED can serve as the light source.

The radiation or light of multiple light sources can be combined and injected into a common optical fibre by a beam combiner. If only a single light source is used, then its light can be guided to the light collimation unit through an optical fibre.

A primary collimation lens which serves to generate a collimated light wave field can be disposed downstream of the point of light exit out of the optical fibre. This collimated light wave field can for example be used to illuminate a stereoscopic display.

Further, the primary collimation lens can be followed in the direction of light propagation by an angular filter in the form of a volume hologram, whose thickness is chosen such that the light wave field shows an angular distribution of wave vectors and that the maximum deviation of the angle distribution of wave vectors of the light wave field does not exceed a specifiable value of for example $1/20°$ in at least one direction. This makes it possible to limit the angular spectrum of plane waves in at least one direction to a specifiable angular range already in the light collimation unit and to define the thickness of the volume holograms which are disposed downstream of the light collimation unit only under consideration of the desired beam broadening or beam deflection effect.

The collimated light wave field can illuminate a first micro-lens array of the light collimation unit.

A scattering device can be disposed in the focal plane of the first micro-lens array, from which the light propagates to a first aperture stop which is situated immediately downstream of the scattering device, where the apertures of the first aperture stop can have asymmetric lateral extents in order to generate an angular spectrum of plane waves of the light wave field with specifiable coherence properties with regard to the respective lateral extent. This is particularly important in the case of a mixed holographic and stereoscopic encoding of the display, where the light wave field must exhibit sufficient coherence in the direction of the holographic encoding, but sufficient incoherence in the direction of the stereoscopic encoding.

The apertures of the first aperture stop of the light collimation unit are dimensioned such that the coherence properties of the light wave field differ in two different directions such that the radiation is substantially incoherent in the one direction, whereas it is sufficiently coherent in the other. Generally, the degree of coherence of the radiation is the larger the smaller the aperture in the respective direction.

A second micro-lens array is preferably arranged downstream of the first aperture stop in the direction of light propagation such that the apertures of the first aperture stop coincide with the rear focal points of the corresponding micro-lenses. The second micro-lens array thus generates a segmented light wave field with an angular spectrum of plane waves with which a following light modulator which carries a holographic code is illuminated either directly or after lateral enlargement of the light wave field.

Two further aperture stops are preferably disposed between the first aperture stop and the second micro-lens array, said further aperture stops serving to prevent light of a secondary light source of the first aperture stop from propagating to a different micro-lens than the one it is assigned to (illumination cross-talking).

The light modulator can be of a transmissive, reflective or transflective type.

The illumination device is designed and dimensioned such that it illuminates the active area of the light modulator substantially homogeneously.

When the light waves are diffracted by the volume holograms, however, the angular spectrum of the light wave field is modified such that for example the modification of the angular spectrum of plane waves of the light collimation unit when being diffracted by the volume holograms must be taken into consideration when choosing the parameters of the light collimation unit. For example, the anamorphic broadening by a factor of 10 will cause the angular spectrum of plane waves to be reduced on average by the same factor in that direction. It can thus be necessary that at least one parameter of the light collimation unit is modifiable in order to generate a specifiable angular spectrum of plane waves of the light wave field downstream of the at least one volume hologram. This can be realised for example by way of a controlled or manual adjustment of a respective optical component of the light collimation unit or by adequate design of the light collimation unit for a specific application.

However, it is also possible at the same time that the angular filtering effect of the at least one volume hologram is used to suppress disturbing portions of radiation or diffraction orders for an observer who looks at the display. This is particularly useful in a holographic display as described in document WO 2006/066919 A1, because higher or unwanted diffraction orders must be suppressed or blanked out there.

Further, there is the possibility that one of the volume holograms is designed such that it has the function of a field lens, in addition to its function of a broadening element. Thanks to such a field lens function, a real or virtual light source can be imaged into an image plane of the light source in a holographic display as described in document WO 2006/066919 A1.

The present invention is particularly preferably applied in a holographic display as described in documents WO 2006/066919 A1 or WO 2004/044659 A2. It allows to give the holographic display a flat and space-saving design.

With very high frame rates of for example 240 fps (frames per second), it is advantageous to design the illumination device such that individual regional segments can be turned on and temporally modulated independently of each other, so that for example only those regions on the light modulator are illuminated which have reached the desired adjustment value or set-point value (e.g. the phase plateau during the switching operation of a liquid crystal phase modulator). This operational mode is also referred to as scanning.

For this, it makes sense to modify the illumination device of the holographic display such that a shutter is disposed upstream of the first micro-lens array of the light collimation unit (in the direction of light propagation), where multiple strip-shaped segments which run in the horizontal or vertical direction can be activated in said shutter, i.e. such that strip-shaped regions on a subsequently disposed light modulator can be illuminated optionally.

One realisation option of a scanning illumination of the light modulator is then for example that always two strip-shaped segments of the illuminating light are switched on which run vertically in the plane of the light modulator and which can be moved sequentially in the horizontal or vertical direction between the edge of the light modulator and its centre.

However, the use of shutters for light control has the disadvantage that it comes with a loss in light output, because only a small portion of the shutter elements are switched on, i.e. transparent at any one time.

Another possibility of realising large-area scanning illumination devices is to not enlarge the segmented plane wave field which is emitted by a miniature plane light collimation unit by a combination of two volume gratings in two perpendicular directions, but rather to use the second volume grating only, which has the two-dimensional enlarging effect, and to illuminate it by a light collimation unit with line structure, where a line has at least two light sources which can be switched independently of each other and, at the exit, at least two collimating refractive lenses, and where these lines are arranged side by side along an edge of the subsequently arranged two-dimensional enlarging unit such that they illuminate the entire surface of the latter. The volume grating diffracts the light beams which are incident at a flat angle such they leave the volume grating substantially perpendicular to its surface.

The illuminating surface which is formed by the exit of the line-shaped light collimation unit can also illuminate the entry surface of a wedge-shaped light waveguide device made of a refractive material such as glass to whose exit surface, which is substantially perpendicular to its entry surface, the two-dimensional volume grating is attached.

It is also possible that instead of the wedge-shaped light waveguide device made of a refractive material no optical medium or air is provided and that the illuminating light that is emitted by the line-shaped light collimation unit falls directly onto the two-dimensional volume grating or a material that carries the two-dimensional volume grating.

This arrangement enlarges the segmented plane wave field which is emitted by the light collimation unit and directs it at the surface of a following light modulator.

Depending on the number of lines which are arranged side by side in the light collimation unit and the number of light sources which can be switched independently of each other in each line, the thus formed illumination device has a matrix of independently switchable illumination segments.

However, this solution is rather inefficient if each segment of the thus formed illumination device is illuminated and switched by a dedicated light source, as is described for example in document WO 2004/109380.

In order to improve utilisation of the available light power and, moreover, to do with as few primary light sources as possible, it makes sense to control and distribute the light of very few light sources e.g. through a system of cascading light waveguides or switches.

An active optical switch can for example redirect the light from one optical fibre to another one when a voltage is applied. If multiple of such branches are connected in line, for example in a tree structure, then a single primary light source can generate 2 to the power of N switchable secondary light sources, where N is the number of cascades.

One realisation option in this respect can thus be such that selected lenses of a primary collimation lens array which is situated upstream of the first micro-lens array of the light collimation unit are illuminated by such a cascade of switchable fibre-optic light waveguides.

A further possibility of illuminating selected lenses of a primary collimation lens array which is situated upstream of the first micro-lens array of the light collimation unit is to provide passive light exit points at the ends of optical multi-mode fibres which illuminate one or more primary collimation lenses, according to their actual arrangement.

However, this option means that the light of one primary light source is distributed to multiple secondary light sources without the possibility of actively controlling the individual secondary light sources.

Besides fibre-optic light waveguides and switches, light deflecting elements such as liquid crystal gratings can be used as well in order to illuminate selected segments of the first micro-lens array of the light collimation unit using a combination of two switchable LC-based diffraction gratings which are disposed between a primary collimation lens, which is disposed downstream of the light source, and the first micro-lens array of the light collimation unit, where the intensity of the for example strip-shaped segments can also be varied locally.

The illuminating regions which are generated by combinations of switchable diffraction gratings can also directly illuminate the entry surface of an enlarging unit based on volume gratings and be enlarged by them. The main advantage is that there is no need for a light-absorbing shutter.

Such a combination of gratings can for example comprise a first diffraction grating whose deflection angle can be controlled through the grating constant, whereby a light beam which hits the surface at a right angle leaves the diffraction grating at a certain angle, and a second, controllable diffraction grating which deflects and directs this light beam such that it leaves the grating surface substantially at a right angle again. The amount of the lateral offset of the light beam is then defined by the deflection angle and the distance between the two diffraction gratings.

Since the scanning steps are generally discrete, PDLC volume gratings or polarisation gratings can be used alternatively to LC gratings as switchable diffraction gratings for light deflection and combined with switchable retardation plates. The switchable retardation plates serve for actively switching the polarisation of the light beams. It is thus also possible for example to use a set of polarisation-switching polarisation gratings where the gratings show the same intensity in the positive and negative first diffraction order.

For a specifiable series of fix scanning steps, it is also possible to use an angle division multiplex in conjunction with angle-sensitive volume gratings, where the first diffraction grating is of a switchable type and where the second diffraction grating is disposed upstream of the first micro-lens array of the light collimation unit and designed in the form of an angle-sensitive volume grating through which the specifiable deflection angles for at least one light wavelength are realised thanks to a firmly inscribed diffractive structure. The first one of the two gratings can for example also be a switchable PDLC grating stack.

Now, while the first grating or grating stack realises the active angular deflection of the incident light beams which are collimated by the primary collimation lens, the light beams are laterally offset and oriented parallel to the optical axis by the passive angle-sensitive volume grating depending on their angle of incidence.

Light can also exclusively be deflected by way of space division multiplexing, where the first diffraction grating is of a switchable type and where the second diffraction grating is disposed upstream of the first micro-lens array of the light collimation unit and designed in the form of a volume grating which comprises multiple strip-shaped segments, and where the strip-shaped segments are made such that the light which hits them at an angle that increases as the distance to the optical axis becomes larger is diffracted into a direction that is parallel to the optical axis. This means that with this option the respective strip-shaped segment of the second grating realises a firmly inscribed deflection angle in order to orient a light beam which is incident at an angle to the optical axis such that is becomes parallel to the latter again. This grating can for example also have a region in its centre where no volume grating is inscribed at all, so that the direction of propagation of an incident light beam is not affected.

Besides optical paths which run parallel to the optical axis of the arrangement, it is also possible to realise optical paths which run at an angle to it or asymmetrically. This requires the diffraction gratings which are disposed between the primary collimation lens of the light source and the first micro-lens array of the light collimation unit to be designed such that off-axis optical paths can be realised as well, for example in order to eliminate the $0^{th}$ diffraction order of the gratings if only the first or higher diffraction orders shall be used further down the optical path.

The diffraction gratings which are disposed between the primary collimation lens of the light source and the first micro-lens array of the light collimation unit can also be designed such that certain regions on the first micro-lens array of the light collimation unit can be illuminated in a switchable way in the horizontal and/or vertical direction. This way, an illumination that is oriented in two different directions, i.e. a two-dimensionally scanning illumination, of the subsequent light modulator can thus be realised.

There will be a special problem if the first micro-lens array of the light collimation unit is not illuminated by a single light source combined with a large-area collimation lens, but rather by multiple light sources combined with a collimation lens array. The problem here is a broadened angular spectrum of plane waves of the illumination caused by the diffraction at the edges of the lenses, and it requires additional measures for compensation.

The lenses of the first micro-lens array of the light collimation unit are for example illuminated by segmented plane waves whose angular spectrum exhibits an angular deviation of about $\frac{1}{20}°$ in one direction and of about $1°$ in the perpendicular direction. This limitation of the angular spectrum of plane waves can be necessary e.g. in a holographic display which takes advantage of a one-dimensional horizontal or vertical holographic encoding method.

One solution is then for example to realise an additional angular filtering of the wave field, where for preventing the broadening of the angular spectrum of plane waves through diffraction at the edges of the lenses of the collimation lens array it is followed in the direction of light propagation by a combination of two volume gratings for angular filtering.

The combination of volume gratings for angular filtering of the angular spectrum of plane waves comprises a first, thin volume grating with a wide angular selectivity and a large diffraction angle deviating from the grating surface normal and a second, thick volume grating with a narrow angular selectivity which is designed such that the light beams which are incident in the region of the given angular spectrum of plane waves are substantially diffracted along the grating surface normal and that the light beams which propagate outside the angular spectrum of plane waves are transmitted without diffraction.

An illumination device which has an angular spectrum of plane waves which is limited to $\leq \frac{1}{20}°$ at least in one direction and which comprises a multitude of light sources and a collimating lens array can be created this way for a direct-view display.

To be able to realise an angular filtering of the angular spectrum of plane waves in two perpendicular directions, a second combination of volume gratings, which is turned by $90°$ relative to the first one, can be disposed downstream of the first combination of volume gratings.

The illumination devices for transmissive light modulators (backlight units BLU) can generally also be modified such to illuminate reflective light modulators (frontlight units FLU).

It is for example possible to supplement an illumination device with a large-area volume grating as enlarging unit by a retardation plate, in particular a $\lambda/4$ plate, which is disposed downstream of the two-dimensional volume grating in the direction of light propagation. If for example horizontal linear polarised light falls on this $\lambda/4$ plate, then it will leave the plate having a circular polarisation. A reflective light modulator which is disposed downstream in the optical path reflects the modulated circular polarised light back towards the λ/4 plate; after having passed through this plate again, it exhibits vertical polarisation. This vertical polarised light can now pass through the volume grating unimpeded and without interfering with the initially horizontal polarised light, and it can be perceived by an observer who is situated in front of the volume grating.

Besides the polarisation-wise separation of the illuminating light on the one hand and the reflected and modulated light on the other, there is another way of separating them, namely to take advantage of the angular selectivity of a light deflecting element, such as a volume diffraction grating, which injects the light which is emitted by suitable light sources into a plane waveguide which covers the entire surface of the light modulator and which also couples out the light in order to illuminate the light modulator.

For example, if a transmissive volume grating of sufficient thickness is used and if the light modulator is illuminated at a sufficiently oblique angle, i.e. for example 5°, then there is an 'off-Bragg' illumination of the volume grating on the way back of the modulated light from the reflective light modulator, and this volume grating which is used to illuminate the light modulator thus has no diffracting function. The light which is reflected and modulated by the light modulator can thus propagate to the observer without being obstructed.

BRIEF DESCRIPTION OF THE DRAWINGS

Now, there are a number of possibilities for embodying and continuing the teachings of the present invention. To this end, reference is made on the one hand to the dependent claims that follow claim 1, and on the other hand to the description of the preferred embodiments of this invention below including the accompanying drawings. Generally preferred physical forms and continuations of the teaching will be explained in conjunction with the description of the preferred embodiments of the invention and the accompanying drawings. The Figures are schematic drawings, where FIG. 18a shows a further embodiment of a light collimation unit which makes it possible to illuminate selected parabolic mirrors of a collimation parabolic mirror array of an illumination device for reflective light modulators with the help of optical fibre switches, FIG. 18b shows embodiments of line-shaped light collimation units for injecting the light through volume gratings into plane waveguides according to FIG. 18a.

Identical or comparable parts are given like reference symbols in all the Figures.

DETAILED DESCRIPTION OF THE INVENTION

Figure 1:
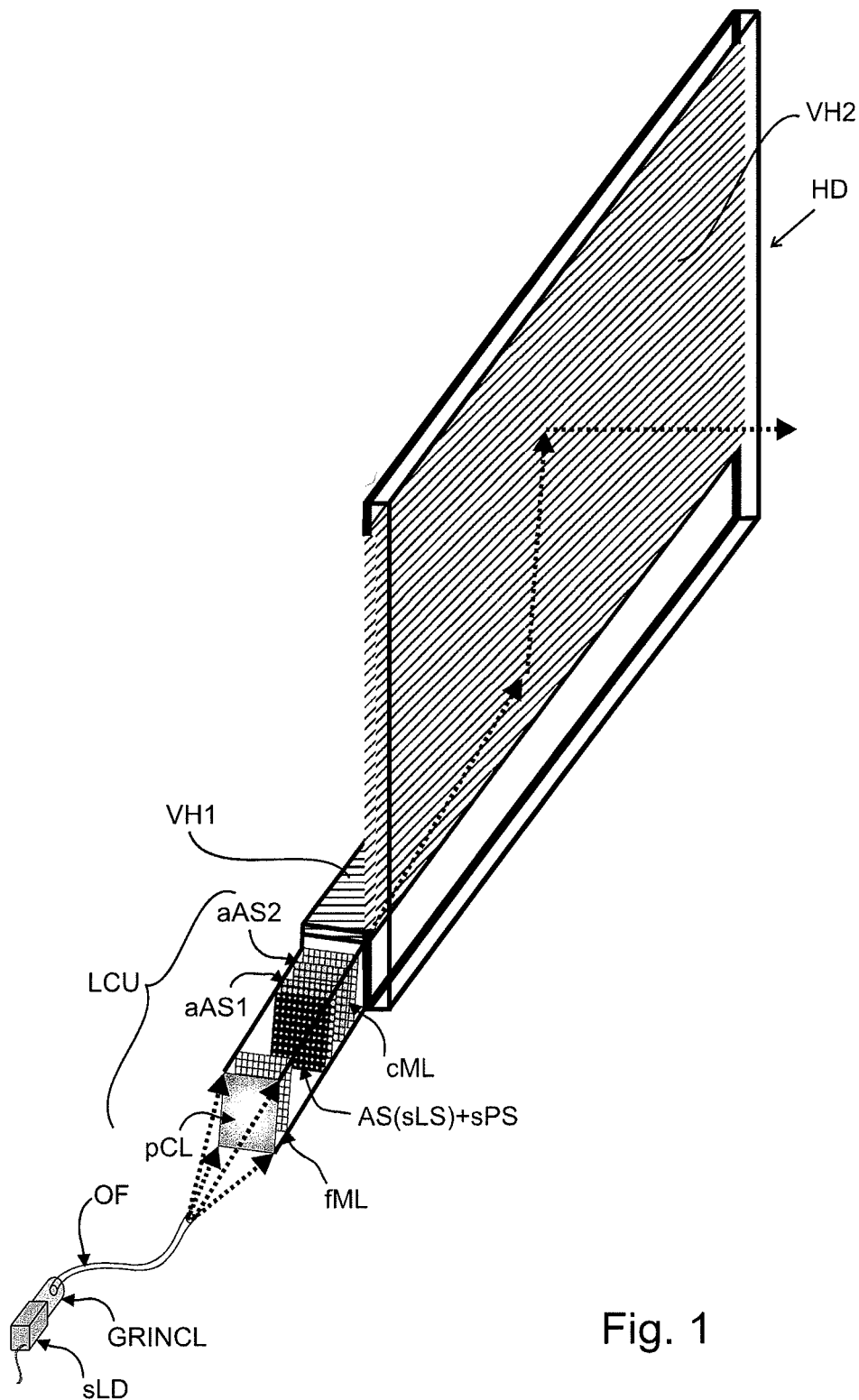
FIG. 1 shows an illumination device comprising a light collimation unit in front of two transmissive volume gratings which broaden the wave field in two directions one after another.

FIG. 1 shows an embodiment of an illumination device of the holographic display, said illumination device comprising a light collimation unit in front of two transmissive volume gratings which broaden the light wave field in two different directions one after another. Here, the light collimation unit which comprises two micro-lens arrays preferably has a small size.

The light wave field is broadened anamorphically, i.e. the enlargement factor differs in the two different directions.

The light which is emitted by a power-(P)-and-wavelength-(λ)-stabilised laser diode sLD is coupled into an optical fibre OF through a gradient-index lens GRINCL.

The divergent light which is emitted by the end of the optical fibre is collimated by the light collimation unit, i.e. formed into a plane wave, which means that the rays of light are oriented in parallel through this collimation. The light collimation unit comprises a primary collimation lens pCL.

The first micro-lens array fML of the light collimation unit LCU focuses the light which falls on this micro-lens array fML in the focal plane of the individual micro-lenses and thus generates an array of secondary light sources sLS.

A scattering plate sPS, which is disposed in the focal plane of the micro-lenses of the first micro-lens array fML, allows the phase of the light to be scattered statistically in space. This scattering plane sPS (see FIG. 1) can for example be a scattering plate sPS which is moved mechanically (e.g. by one or more piezo crystals).

The statistic, temporally variable spatial phase modulation in the secondary light source plane is necessary to be able to generate an illuminated area (called a sweet spot) in the incoherent direction on a light modulator if the hologram is encoded one-dimensionally.

An aperture stop AS(sLS) is disposed downstream of the plane of the scattering plate sPS and serves to limit the spatial extent of the secondary light sources sLS. If a one-dimensional encoding method is used, sufficient spatial coherence must be ensured in one direction. This is achieved by controlling the size of the statistically phase-fluctuating light source. The second, coherent direction is characterised by a small spatial extent of the secondary light source. The apertures of the aperture stop AS(sLS) are thus extremely asymmetrically, for example 15 μm in the incoherent direction and 0.5 μm in the coherent direction, in order to create an angular spectrum of plane waves in an angular range of 0.5° and 1/60 downstream of the second, collimating micro-lens array cML.

Two aperture stops aAS1 and aAS2 are disposed between the aperture stop AS(sLS), which serves as an array of secondary light sources, and the micro-lens array cML, which collimates the secondary light sources sLS, and are used to prevent illumination cross-talking, i.e. to prevent light of a secondary light source from reaching adjacent micro-lenses, i.e. other micro-lenses than the ones they are assigned to.

Figure 2:
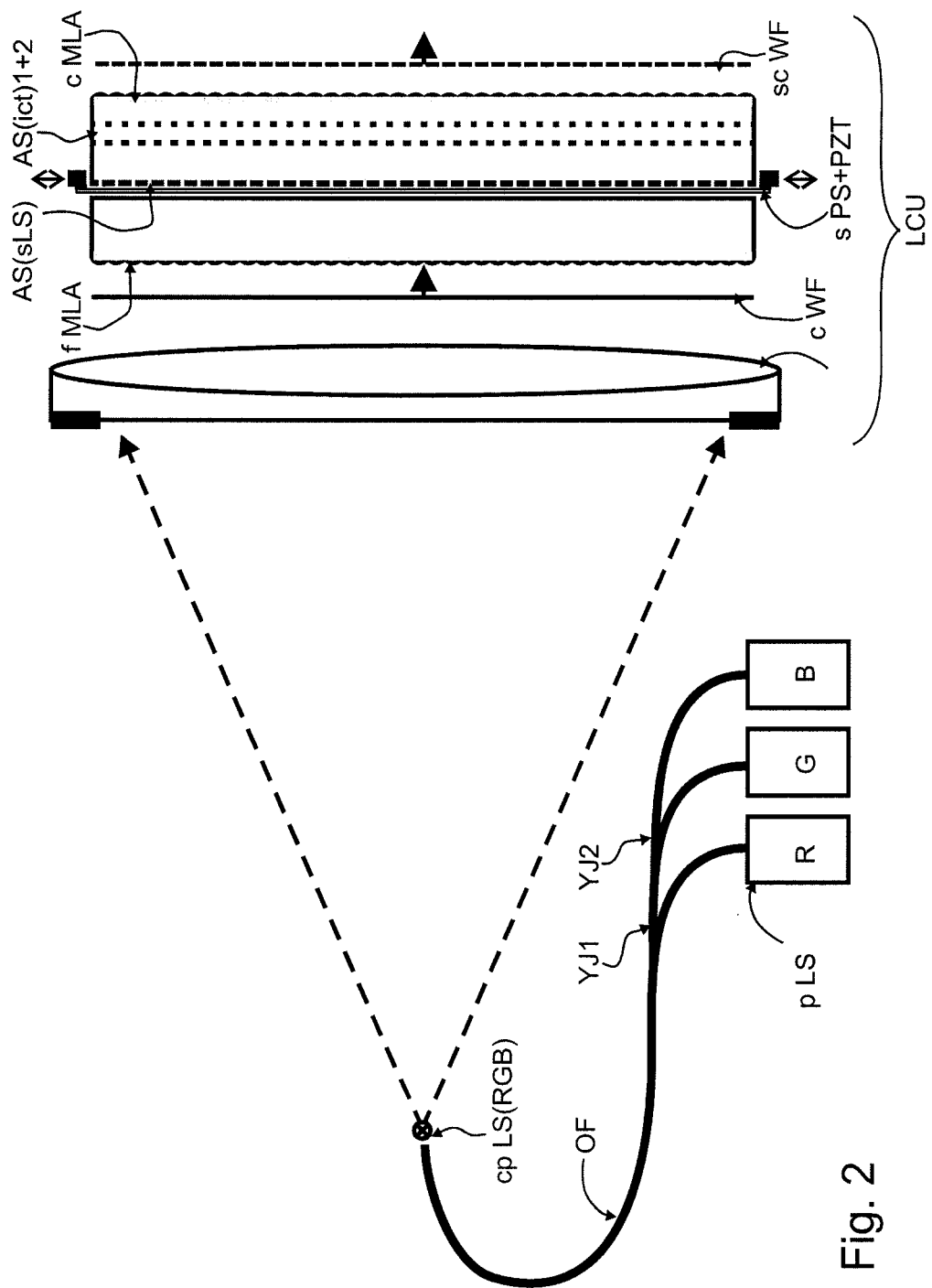
FIG. 2 is a side view of the light collimation unit of FIG. 1.

FIG. 2 shows the light collimation unit LCU of FIG. 1 in a side view from the left. The primary light source here has 3 laser diodes R, G, B, representing the colours RGB, whose red, green and blue radiation is combined in an optical fibre OF.

In FIG. 2 the reference symbols denote the following elements: R: red laser diode; G: green laser diode; B: blue laser diode; pLS: primary light source; YJ1 and YJ2: Y junctions 1 and 2; OF: optical fibre; cpLS(RGB): combined primary light source (red, green, blue); pCL: primary collimation lens; cWF: collimated wave front; fMLA: focussing micro-lens array); sPS+PZT: statistic phase scattering and piezo translation element; AS(sLS): aperture stop (defines the active area of the secondary light sources); AS(ict)1+2: aperture stops 1 and 2 to avoid illumination cross-talking; cMLA: collimating micro-lens array; scWF: segmented collimated wave front.

Figure 3:
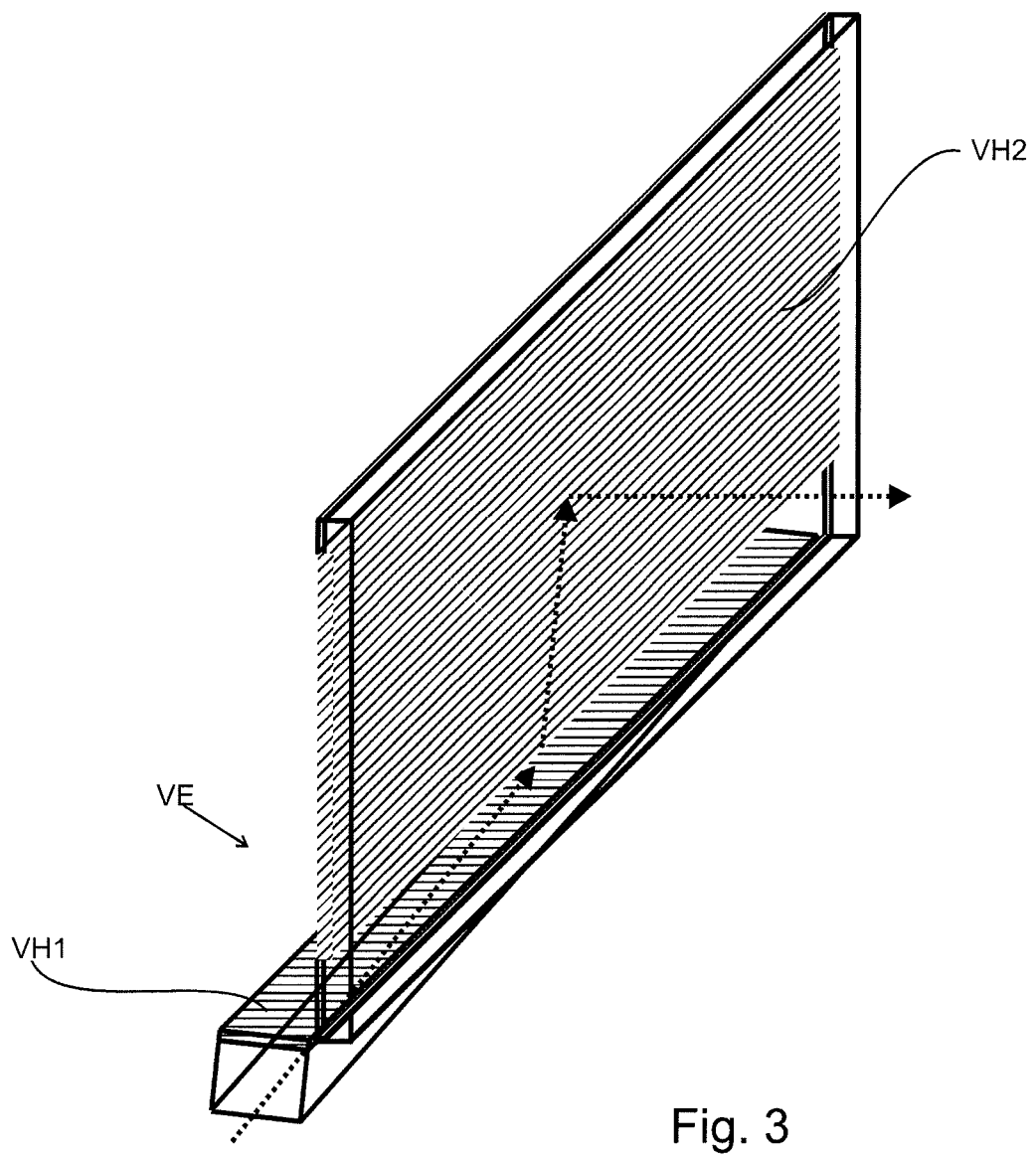
FIG. 3 illustrates the principle of the twofold beam broadening in an illumination device in two perpendicular directions with the help of two transmissive volume gratings.

FIG. 3 illustrates the principle of the twofold beam broadening in an illumination device in two different (here perpendicular) directions with the help of two transmissive gratings in the form of volume gratings. The light wave field which comes from the LCU is deflected and broadened by the first transmissive volume hologram VH1. Thereafter, this light wave field is deflected and broadened once again by the second transmissive volume hologram VH2.

In the embodiment shown in FIG. 1 the light collimation unit is disposed upstream of these two gratings in the optical path SG.

The volume holograms of the enlarging unit can preferably be manufactured for example by way of in-situ exposure of accordingly sensitised light-sensitive materials having a suitable thickness. This way, the real aberrations which are existing in the illumination device can be compensated by these volume holograms.

Figure 4:
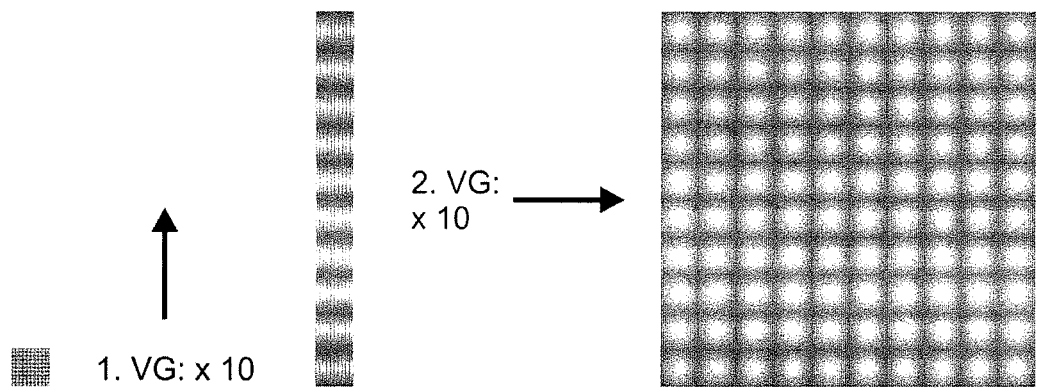
FIG. 4 shows the twofold beam broadening by a factor of 10 each as realised by the embodiment illustrated in FIG. 3.

FIG. 4 illustrates how the wave field of a segmented collimated wave front is broadened in two directions one after another by a factor of 10 each with the help of two transmissive volume gratings VH1 and VH2 which are disposed downstream of the light collimation unit, as shown in FIG. 3.

The angular spectrum of plane waves of the segmented collimated wave front scWF which exists downstream of the light collimation unit LCU is modified by way of diffraction in the two volume holograms or gratings. The angle $\theta_s$ of the individual diffraction orders m of the signal waves downstream of the grating is calculated as follows:

$$\theta_s = \arcsin(m\Lambda/(n\Lambda_x) + \sin(\theta_R)) \quad \text{(Equation 1)}$$

where $\Lambda$ is the wavelength, n is the refractive index, $\Lambda_x$ is the period at the surface of the volume grating, and $\theta_R$ is the angle of the reconstructed beam, i.e. the angle at which the illuminating beam hits the volume grating in rad. The sign convention of the angles for quadrants 1, 2, 3 and 4 is +, +, − and −.

The arcsin(x) is derived as follows:

$$\frac{d}{dx}\arcsin(x) = \frac{1}{\sqrt{(1-x^2)}} \quad \text{(Equation 2)}$$

Then, $d\theta_S/d\theta_R$ is:

$$\frac{d\theta_S}{d\theta_R} = \frac{\cos(\theta_R)}{\sqrt{(1 - (m\Lambda/(n\Lambda_x) + \sin(\theta_R))^2)}} \quad \text{(Equation 3)}$$

The target angular ranges of the angular spectrum of plane waves PWS is 1/60° in the coherent direction and 0.5° in the incoherent direction. Assuming that tan(0.5°)*1000 mm=8.73 mm, it can be said that ±0.25° angular spectrum of plane waves is sufficient to create a 9-mm wide sweet spot at a distance of 1 m to the display. The angular spectrum of plane waves of the illumination should not be chosen too wide, because it can still be broadened further by a deflection unit for observer tracking (see document WO 2006/066919 A1, for example) that is arranged downstream of the display as such. Such a deflection unit is described for example in documents WO 2010/066700 or PCT/EP2010/058625.

If deflection angles for observer tracking are 30° and more, the angular spectrum of plane waves which exists for example upstream of the deflection unit can be chosen smaller than 1/60° in the coherent direction too, for example only 1/100°, so to ensure that the angular resolving power limit of the human eye (which is about) 1/60° is not exceeded even at large deflection angles.

However, according to Equation (3), there is an angle reduction by the factor of 0.1 in the volume gratings which are shown in FIGS. 3 and 1. This means that if there is an angular spectrum of plane waves of ±0.25° at $\theta_{R0}$=84.26° and $\theta_{S0}$=0°, i.e. in the design geometry, then it will be transformed to an angular spectrum of plane waves of ±0.025° downstream of the grating. If the geometry is the other way round, then the factor will be 10.

The angular spectrum of plane waves of the light collimation unit is thus ±1/12° and ±2.5° for a one-dimensional encoding of the light modulator. With this type of encoding, the three-dimensional scene is encoded or generated holographically in the one direction and stereoscopically in the perpendicular direction. Depending of the direction of holographic encoding, it is referred to as a horizontal parallax only (HPO) or vertical parallax only (VPO) type encoding.

In the event of an exclusively stereoscopic encoding, where the coherence properties of the illumination do not play a role, a limitation of the angular spectrum of plane waves to a certain angular range which is much smaller than 1° is irrelevant, so that an angular range of no more than 3° is definitely permissible in the horizontal and/or vertical direction.

Figure 5:
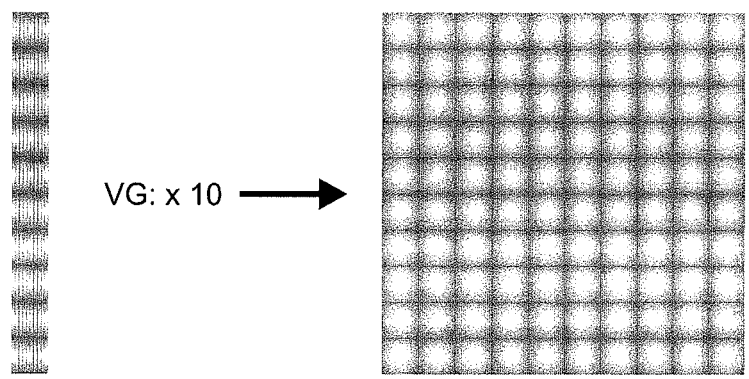
FIG. 5 shows an anamorphic enlargement of a light modulator (SLM, left) by a factor of 10 in the horizontal direction in the plane of a holographic off-axis lens.

As shown in further embodiments, the explanations above can also apply to achieve an enlargement of the encoding surface of the light modulator of a display, in particular of a holographic display. Here, it is preferably possible to minimise the number of optical components used in the holographic display. In addition, it is further preferable to minimise the size of the light modulator at least in one direction (see FIG. 5).

For this, it is for example possible to use a volume grating which is designed in the form of an off-axis field lens in order to achieve an anamorphic enlargement preferably in the incoherent direction of the light modulator—for example of a one-dimensionally encoded holographic display.

The anamorphic enlargement in one direction has the advantage that a reflection-type light modulator can be used which is as high as the display but which has only 1/10 of the width of the display. This is shown in FIG. 6.

The fact that the enlargement is achieved with the help of an off-axis lens, which is realised in the form of a transmissive volume grating, reduces the number of components in the display. The lens can have the effect of an angular filter in one direction. This means that the light modulator can be attached to the bottom edge of the display, where the volume grating can cut the angle of the virtual viewing window (e.g. the viewing window VW in document WO 2006/066919 A1) in the coherent direction out of the wave front that impinges on the grating and diffract only that angle towards the observer in its function of a field lens. This means that the view shown in FIG. 6 can also be the side view of a holographic display.

Figure 6:
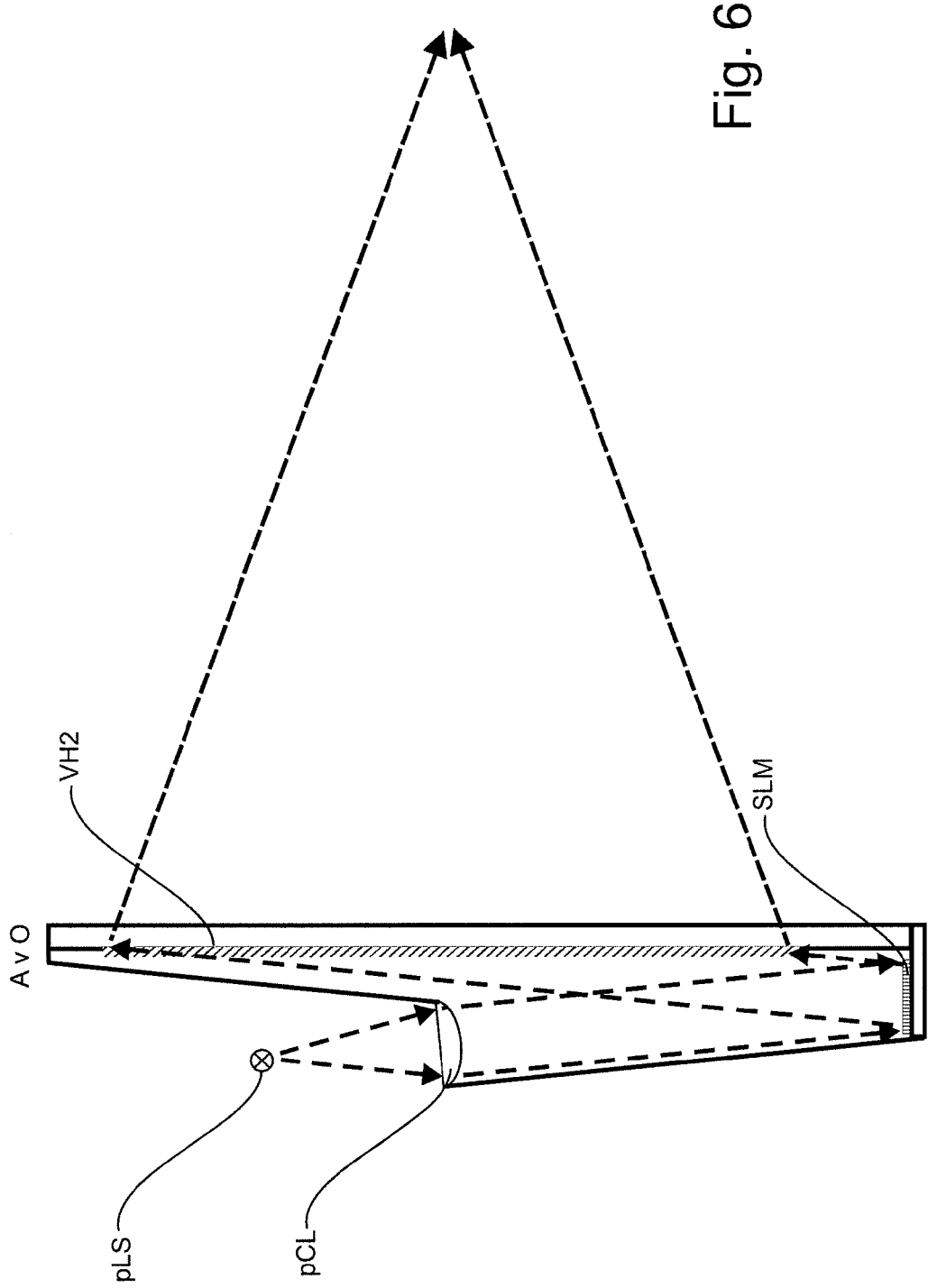
FIG. 6 is a top view which shows an arrangement with a reflective light modulator (SLM, bottom, disposed on a base plate) which is anamorphically enlarged by a factor of 10 in one direction with the help of an off-axis field lens which is designed in the form of a transmissive volume grating.

The light collimation unit is shown in a simplified manner in FIG. 6. It can for example comprise two micro-lens arrays in addition to the shown primary light source pLS and the primary collimation lens pCL, in order to generate the segmented plane wave field which is required to illuminate the light modulator SLM with the help of apertures and a scattering plate (cf. FIG. 2, for example).

A deflection unit (not shown) for tracking the wave front to a moving observer eye (observer tracking) may be disposed downstream of the field lens VH2, which is the key component to ensuring a compact and flat design. This can for example be two crossed variably controllable diffraction gratings, for example as described in document PCT/EP2010/058625, which realise locally different deflection angles.

A compact design of an illumination device of a holographic display HD is shown in FIG. 1. As a consequence, the size of the light collimation unit LCU, which comprises two micro-lens arrays fMLA and cMLA, is very small. The embodiment shown in FIG. 1 was originally intended to illuminate a light modulator (not shown) which has substantially the same size or outer dimensions as the display and which is disposed downstream of the enlarging unit VE. However, according to a further embodiment, it can also be used to enlarge the light modulator anamorphically. This is done in analogy with the design of a telescope, which effects for example a beam broadening by a factor of 10. The voluminous design of a telescope can thus be minimised greatly. This can be achieved by way of consequently following the approach of beam broadening using gratings, which are here designed exclusively in the form of transmissive volume holograms VH1, VH2, which shall, however, not be construed to limit the universality of the invention. The principle is shown in FIG. 3.

The light modulator can be disposed upstream of the enlarging unit VE of FIG. 3 and be either of a reflective or of a transmissive type. However, reflective arrangements are preferred. Such a light modulator could for example be designed in the form of a liquid crystal on silicon (LCoS) element or micro electro-mechanical system (MEMS), for example a digital micro-mirror device (DMD). A light collimation unit LCU and a light modulator can be provided for each of different colours or light wavelengths, which can be combined with suitable beam combining elements (for example an X cube, comparable with beam splitter plates in colour CCD cameras, but run in the other direction) and coupled into the embodiment shown in FIG. 3.

To this end, in such an embodiment, it is not only the light collimation unit LCU that is disposed upstream of the two volume gratings VH1, VH2 which serve as enlarging unit VE in the optical path SG, but the light modulator too is disposed upstream of the two volume gratings VH1, VH2 according to this invention. The light modulator is then disposed downstream of the light collimation unit LCU of FIG. 2, but upstream of the two volume gratings VH1, VH2 of FIG. 3.

The light modulator of a 24" display with an aspect ratio of 16 (horizontal):9 (vertical) then has a size of 53 mm×30 mm instead of 530 mm×300 mm. Small light modulators can be run in the reflective mode. Because the response time $\tau \sim d^2$ (where d is the thickness of the SLM), operation in the reflective mode brings about a possible increase in the frame rate by a factor of 4. In addition, the electronic control elements (backplane) do not have to be made transmissive.

FIG. 4 illustrates how the wave field of a segmented collimated wave front is broadened or enlarged in two directions one after another with the help of two transmissive volume gratings VH1 and VH2, which are disposed downstream of the light collimation unit LCU, as shown in FIG. 1. This principle of a twofold beam broadening can not only be taken advantage of in order to be able to use a highly compact light collimation unit LCU in the display, but also a light modulator SLM of very small size, where the latter can also be of a reflective type. Light modulators with a small active surface are much less expensive than those with a large active surface.

The two volume gratings VH1 and VH2, which are disposed downstream of the light modulator in the direction of light propagation, can be used for angular filtering in analogy with the illumination device (backlight unit) BLU. This means that the thickness of the volume gratings VH1, VH2 shall be chosen such that the angular spectrum of plane waves is limited to max. ±1/20° in the coherent direction and to max. ±1/2° in the incoherent direction. The enlarged light wave field sWF of the light modulator SLM can for example be arranged in space at an oblique angle to the second, two-dimensional volume grating VH2, depending on the actual design of the volume gratings VH1, VH2. In a holographic display as described for example in document WO 2006/066919 A1, however, individual points of a three-dimensional scene to be represented can be generated by way of holographic encoding in different depth regions. Insofar, when a three-dimensional scene is represented, a possible inclination of a light wave field that is enlarged by the two volume gratings VH1, VH2 can be taken into consideration by creating the individual points of the scene at accordingly different distances to the second volume grating VH2.

Figure 7:
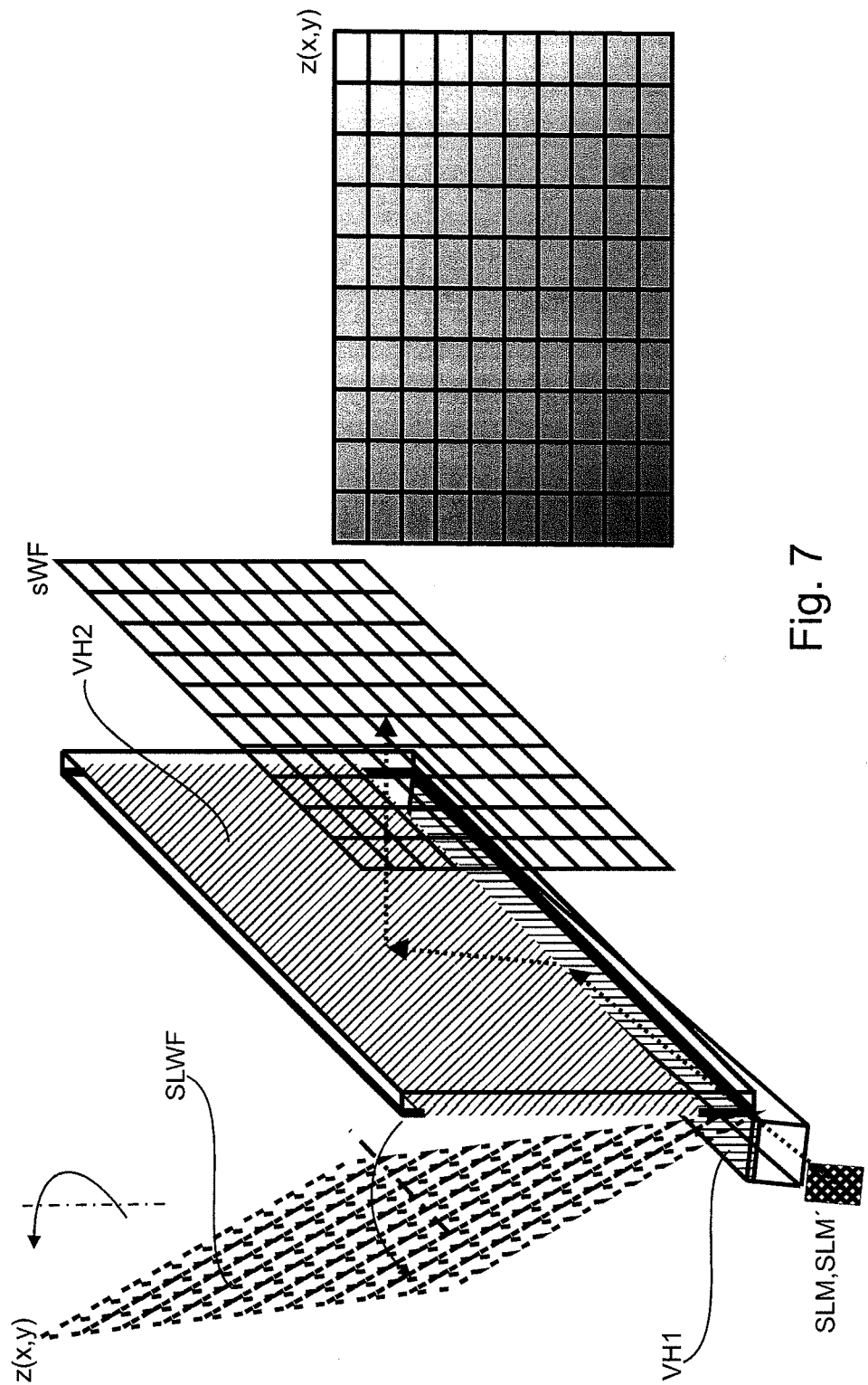
FIG. 7 shows the enlargement of the encoding surface of a light modulator where the difference in optical path length of the light beams at the various points on the encoding surface after passage through the arrangement is indicated by different shades of grey.

The inclination SLWF of a light wave field sWF that is enlarged by the two volume gratings VH1, VH2 is a result of the different optical path lengths of the light beams when passing through the volume gratings VH1, VH2. This is shown in FIG. 7 for a light modulator SLM which is enlarged in two directions. The enlarged encoding surface of the light modulator SLM shows differences in the optical path lengths of the light beams which pass though individual points, which is indicated by different shades of grey in the front view (right-hand side in FIG. 7). This difference is the greatest between the two diagonal corners with the greatest brightness difference, i.e. bottom left and top right corner. This must be taken into account when encoding the depth of the three-dimensional scene which is to be reconstructed by the display.

Another requirement which results from the difference in path length relates to the coherence length of the light beams which are emitted by the illumination device. Due to the difference in optical path length in two individual points on the enlarged encoding surface of the light modulator, which can for example represent points of a sub-hologram (see document WO 2006/066919 A1), the coherence length of the light must be greater than the maximum possible optical path length difference between these points, so that these light beams are still capable of generating interference. If the encoding surface is divided into sub-regions (as indicated in FIG. 7 in the form of squares), which can for example correspond with sub-holograms, the coherence length must be greater than the difference in optical path length between the two diagonally opposed corner points with the greatest difference in optical path length, so that interference can still occur across the entire area of a sub-hologram. As explained above, it must also be considered that the difference in optical path length can be enlarged further by subsequently arranged optical components, e.g. for observer tracking.

The surface area of a beam combining device, e.g. as described in document PCT/EP 2010/058626, where it is referred to for example as 'light wave multiplexing means', can preferably also be very small if the light modulators and the beam combining device are disposed upstream of the enlarging unit VE. Alternatively, a birefringent calcite plate of relatively small dimensions can be used, which would serve to have a similar effect.

Disturbing emission angles, e.g. as caused by diffraction at the apertures or cross-talking in the light collimation unit, can be prevented from propagating towards the observer eye thanks to the angular filtering function of the volume gratings VH1 and VH2. The angular selectivity of the volume grating VH2 shall thus be chosen such to suit the actual application.

The angular range of a virtual viewing window VW can be specifically cut out of the encoded wave field. This corresponds to a smoothening of the encoded wave function and can be optimised such that diffraction orders which occur beside the virtual viewing window VW are suppressed or avoided. The light modulator SLM should then be illuminated with an angular spectrum of plane waves of the light which does not exceed the angular range of $1/60°$ in the coherent direction. However, the angular range can be as great as $±3°$ downstream of the light modulator SLM.

The illumination device according to the embodiments shown in FIGS. 1 and 6 can for example also be designed in the form of and used as a so-called frontlight, which serves to illuminate a reflective light modulator. The polarisation of the light which is emitted by the illumination device and which falls on the light modulator can for example be modified with the help of a retardation plate, so that the light which is reflected by the light modulator can pass through the illumination device substantially without being deflected and propagate towards the observer and that it does not re-enter the illumination device. Such a retardation plate should be designed in a suitable manner and it should be disposed between the illumination device and light modulator. As an alternative to using a retardation plate, the illuminating light can be prevented from re-entering the illumination device after being reflected by the light modulator in that the illuminating light leaves the illumination device such that it will not be reflected in itself when being reflected by the light modulator, for example if the light leaves the illumination device at an angle of 5° relative to the surface normal of the light modulator. The volume grating of the illumination device would have to be designed accordingly for this. In this case, the light which is reflected by the light modulator does not 'see' the volume grating of the illumination device due to a specifiable angular selectivity of the volume grating or volume hologram, thus passing through the illumination device substantially without being deflected.

With very high frame rates of for example ≥240 fps (frames per second), it is advantageous to design the illumination device such that individual regional segments can be turned on and temporally modulated independently of each other, so that for example only those regions on a subsequently arranged light modulator are illuminated which have reached the desired adjustment value or set-point value (e.g. the phase plateau during the LC switching operation).

One possibility of realising large-area scanning illumination devices is to not enlarge the segmented plane wave field which is emitted by a miniature light collimation unit by a combination of two volume gratings in two perpendicular directions, but rather to use the second, two-dimensionally enlarging volume grating only, and to dispose along one of its edges, namely the one from which the light falls on the grating, in subsequent arrangement so many line-shaped light collimation units comprising at least two light sources which can be switched independently of each other and, at the exit, at least two collimating refractive lenses that they illuminate the entire surface of the volume grating across the entire width of the edge. After enlargement by the two-dimensional volume grating, an array of independently switchable illumination segments is created the total number of which is the product of the number of collimation lines and the number of switchable light sources per line.

Figure 8:
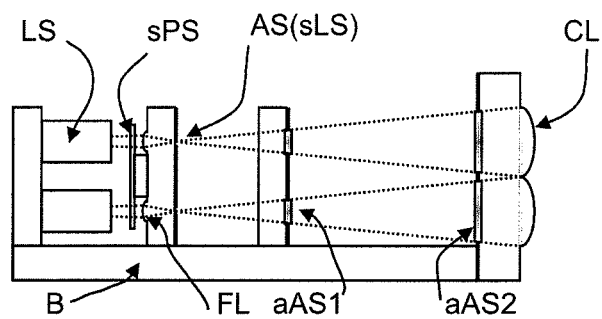
FIG. 8 shows the design of a single cell of a line-shaped light collimation unit.

An individual line of such a light collimation unit is shown in FIG. 8, where the reference symbols have the following meanings: LS: light source; sPS: statistic phase scattering element; FL: focussing lens; AS(sLS): aperture stop (secondary light sources); B: base plate; aAS1: apodised aperture stop 1; aAS2: apodised aperture stop 2, CL: collimation lens.

The illuminating surface which is formed by the exit of the line-shaped light collimation unit can also illuminate the entry surface of a wedge-shaped light waveguide device made of a refractive material such as glass to whose exit surface, which is substantially perpendicular to its entry surface, the two-dimensional volume grating is attached. Such a light waveguide device is described by the embodiment according to FIG. 9 and denoted by the reference symbol LE.

It is also possible that instead of the wedge-shaped light waveguide device LE made of a refractive material no optical medium or air is provided and that the illuminating light that is emitted by the line-shaped light collimation unit falls directly onto the plane volume grating or a material that carries the two-dimensional volume grating.

Figure 9:
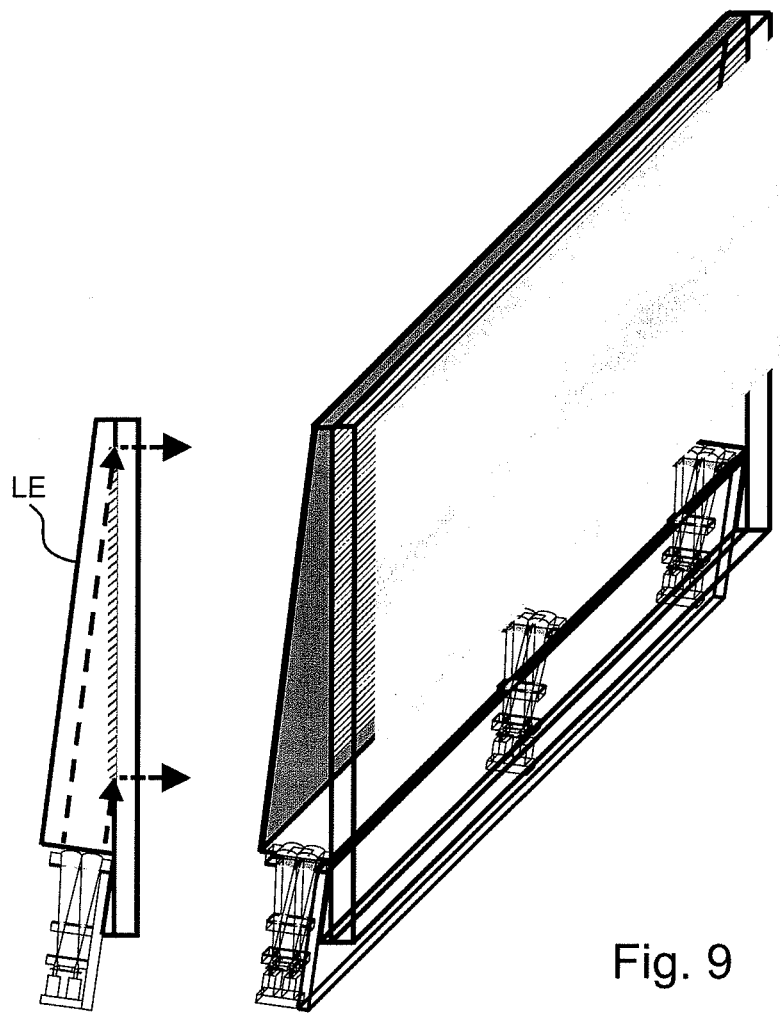
FIG. 9 illustrates a further embodiment of a flat illumination device with a light collimation unit comprising a double row of collimating refractive lenses (left: side view, right: perspective view showing three double lenses only)

The embodiment shown in FIG. 9 of a flat illumination device comprising a double row of collimating refractive lenses is based on the feature to control single light sources or output coupling points of light waveguides as secondary light sources. For example, 5-mm wide stripes can be illuminated independently of each other in the horizontal direction. Each lens at the exit of the light collimation unit can for example be assigned with a laser diode LD as a light source. If the two laser diodes which are collimated by a double lens are switched on, then a vertical stripe with the width of a lens will be illuminated almost homogeneously, e.g. the regions 11 and 12 in FIG. 10. However, these regions can be switched on and off separately too.

Figure 10:
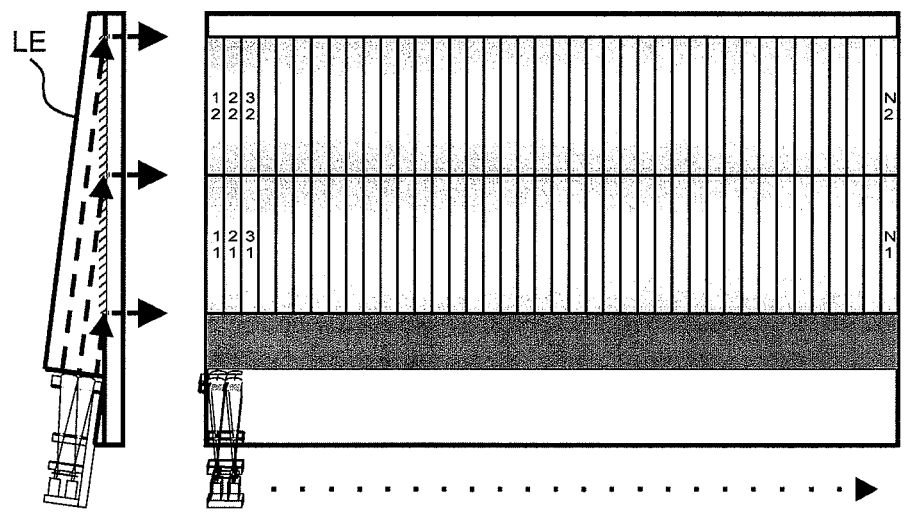
FIG. 10 illustrates a further embodiment of a flat illumination device with a light collimation unit comprising a double row of collimating refractive lenses (left: side view, right: front view showing two lines of the light collimation unit only)

The individual regions on the illumination device which can be controlled, i.e. illuminated, independently of each other are numbered in FIG. 10. The illumination device is divided into two regions vertically and into a multitude (e.g. 40 in FIG. 10) of regions horizontally. The arrangement shown in FIG. 10 can also be viewed as one of multiple sub-regions of a tiled illumination device. For example, there will be four segments vertically if two such sub-regions are joined at their long ends. The gap width of the non-illuminated area here is ≤100 µm so that it cannot be perceived by the observer if the display plane or a plane in the immediate vicinity of the display plane, i.e. for example a plane in the depth of the display plane with a distance of between +10 mm and −20 mm is shown as a bright surface.

According to another embodiment of a scanning illumination device, a shutter that is segmented in stripes is disposed upstream of the first micro-lens array of the miniature light collimation unit of an illumination device (see FIG. 11) which works according to the principle of an anamorphic enlargement of the wave field downstream of the light collimation unit, where it is possible to control the transparency of multiple strip-shaped segments which run in the vertical or horizontal direction. It is an advantage of this arrangement that disturbing diffracted portions of the strip-shaped shutter are spatially filtered, i.e. blanked out, by the aperture stop (secondary light sources) AS(sLS).

With micro-lenses which have an aperture of for example 5 mm×5 mm, an adjustment tolerance of the segments of the strip-shaped shutter of Dx, Dy=0.1 mm is uncritical.

Depending on the scanning direction, the lens segments of the strip-shaped shutter can be arranged horizontally in order to generate vertical stripes or vertically in order to generate horizontal stripes.

Figure 11:
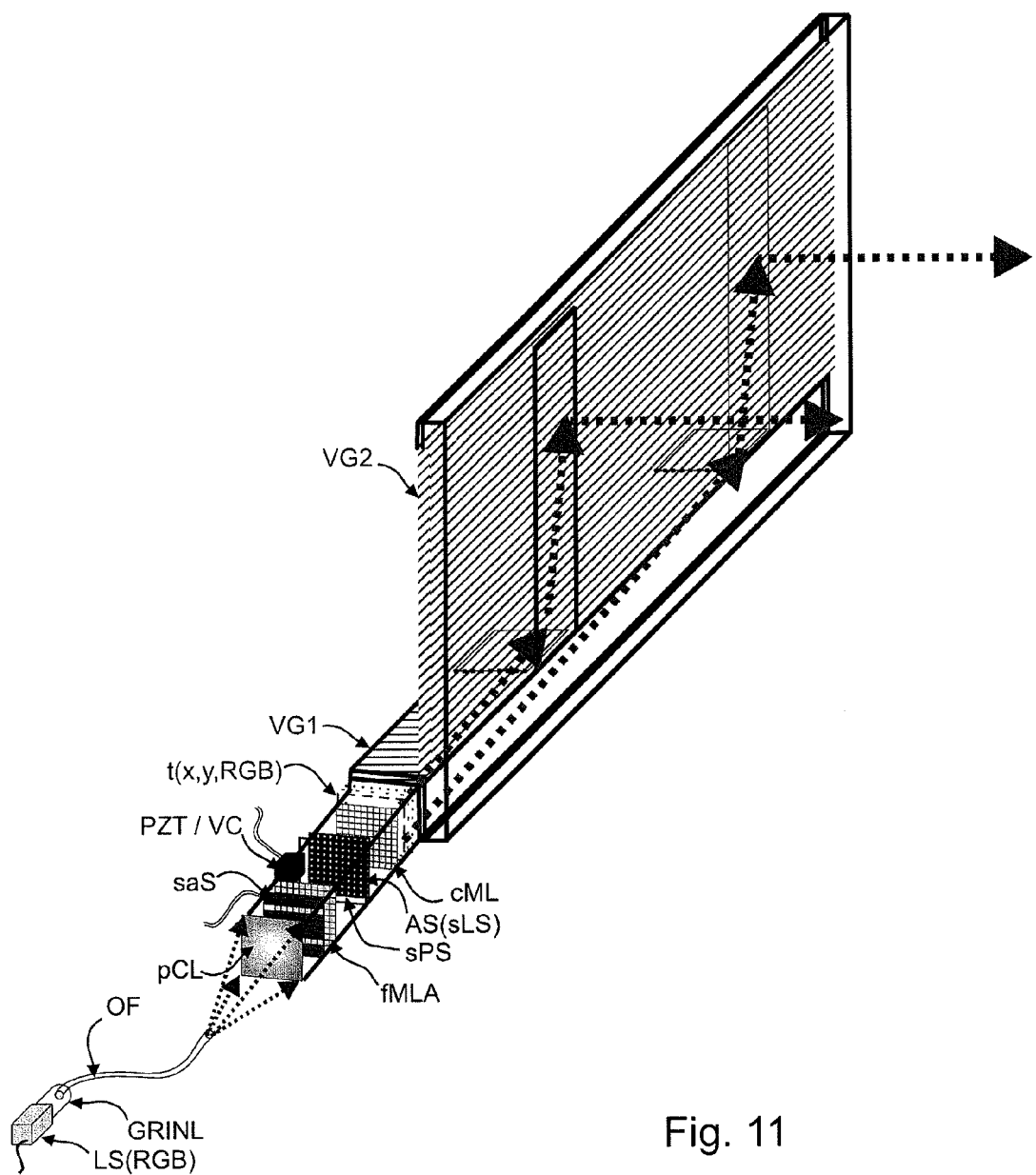
FIG. 11 shows a further embodiment of a scanning illumination device with a shutter which is segmented in stripes, said device realising an anamorphic enlargement of the wave field which occurs downstream of the light collimation unit.

A preferred embodiment has two illuminated vertically or horizontally running stripes lying in the display plane, i.e. in the plane of the light modulator, where said stripes can be moved sequentially in the horizontal or vertical direction between the edge of the light modulator and its centre (see FIG. 11). The light source is turned on for example 3 percent of the time.

The use of shutters goes along with a loss in laser power though. In the embodiment shown in FIG. 11, only 20 percent of the shutter surface are transmissive. Moreover, if no wire grid polarisers WGP are used, then the transmittance will be less than 70 percent. This means that more than 85 percent of the light is absorbed in the shutter plane.

Figure 12:
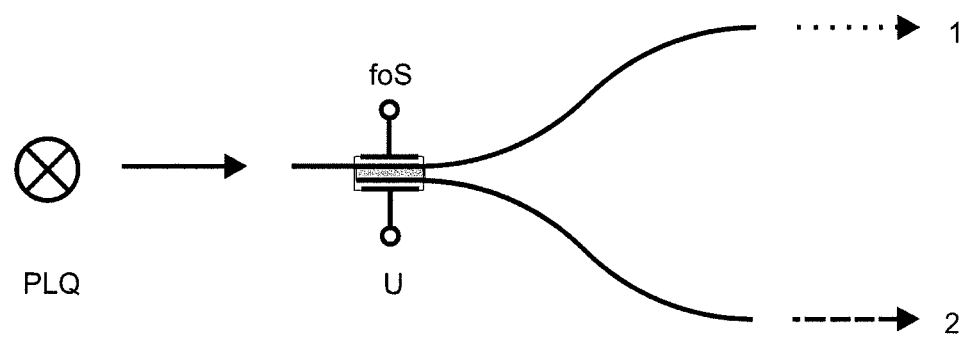
FIG. 12 shows an active optical switch for switching the light emitted by a primary light source between two optical fibres.

The absorption loss can be minimised by using light waveguides in conjunction with fibre-optic switches. One possibility is to illuminate selected lenses of a primary collimation lens array which is disposed upstream of the first micro-lens array of the light collimation unit by a cascade of switchable fibre-optic light sources. It is for example possible that fibre switches as shown in FIG. 12 can switch 500 mW per colour variably between two exits.

Figure 13:
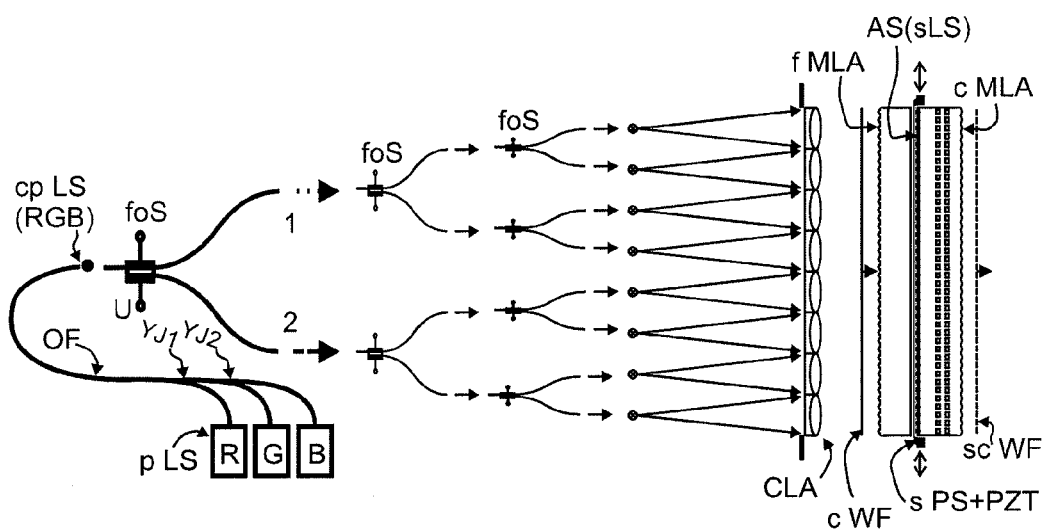
FIG. 13 shows an embodiment of a light collimation unit which makes it possible to illuminate selected lenses of a collimation lens array with the help of a cascade of optical fibre switches.

FIG. 13 shows a cascade of fibre-optic switches foS in a light collimation unit which allows selected lenses of a collimation lens array CLA to be illuminated. The collimation lens array CLA can comprise cylindrical lenses or lenses with square aperture. If cylindrical lenses are used, then the light source images must be broadened accordingly in one direction upstream of the CLA so to fully illuminate the cylindrical lenses. Passive fibre light splitters—for example at a ratio of 1 to 16—can be used for this. The arrangement shown in the Figure can also be applied to a variable splitting of the light emitted by the primary light source pLS into two planes.

Figure 14:
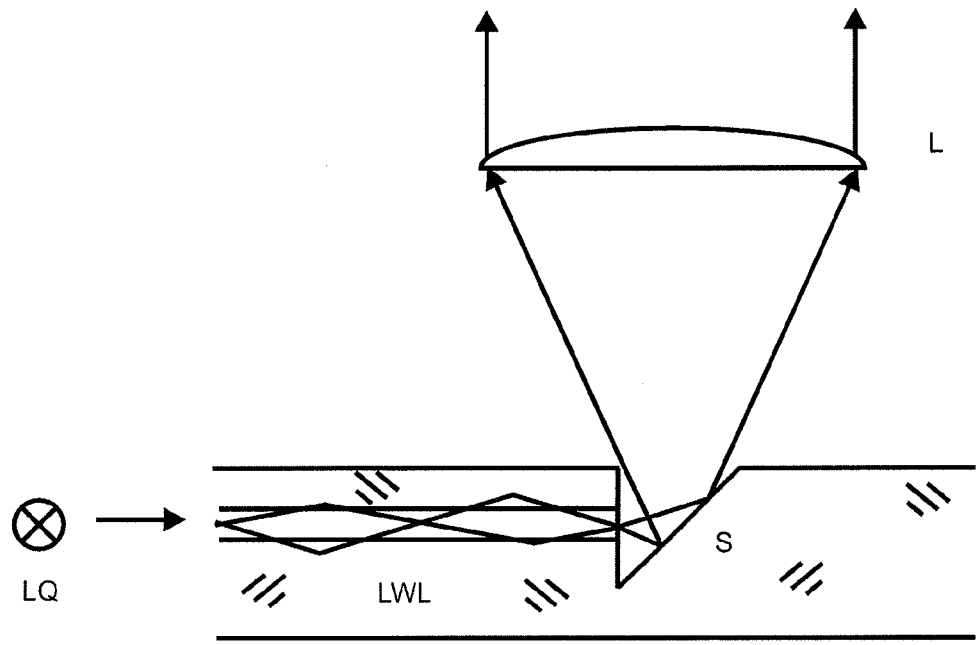
FIG. 14 shows a passive light exit point at the end of a multimode fibre.

FIG. 14 shows a passive light exit point at the end of an optical multi-mode fibre for illuminating specifiable lenses of a primary collimation lens array that is disposed upstream of the first micro-lens array of the light collimation unit. The lens L is situated for example upstream of the first micro-lens array fMLA of FIG. 13. Using this arrangement, the length of the light collimation unit shown in FIG. 13 can be reduced substantially.

The number of primary light sources should be kept as small as possible because stabilisation of multiple lasers to have a common wavelength is rather difficult. One possibility of generating a common wavelength is to use a coupled resonator. However, one primary light source per colour is the preferred embodiment.

Figure 15:
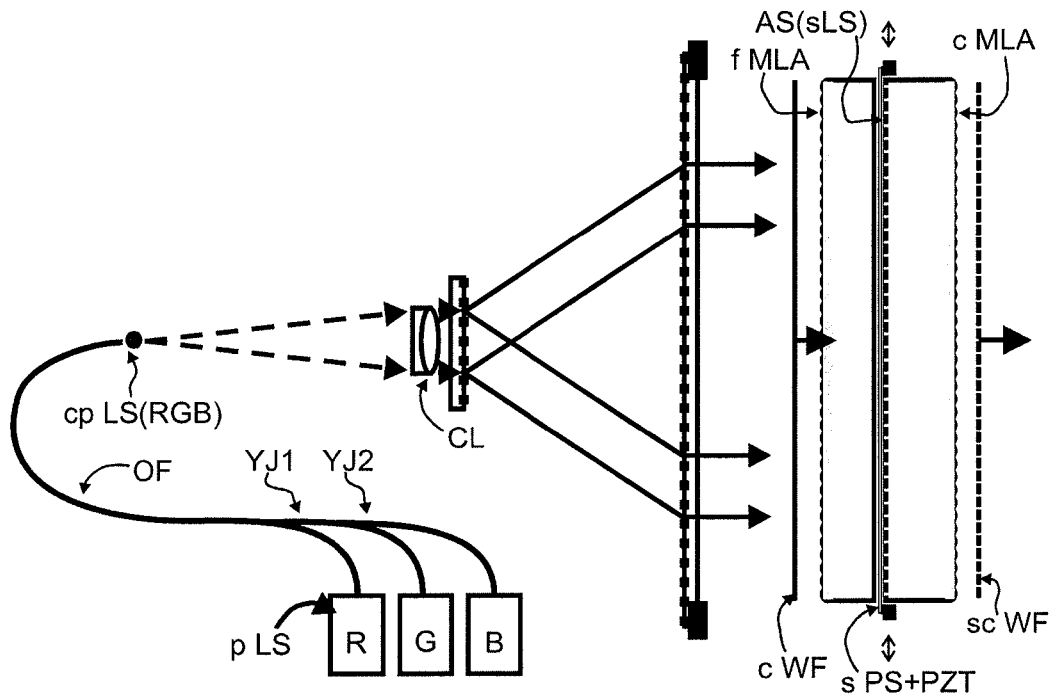
FIG. 15 shows a further embodiment of a light collimation unit which makes it possible to illuminate selected regions of a collimation lens array with the help of two LC gratings.

Besides the use of fibre-optic switches, light-diffracting deflection units such as liquid crystal gratings can be used to illuminate selected stripes of an illumination device in order to minimise the absorption loss caused by shutters in scanning illumination devices. This is illustrated in FIG. 15, where selected segments of the first micro-lens array of the light collimation unit can be illuminated by a combination of two switchable LC-based diffraction gratings, which are disposed between a primary collimation lens that is situated downstream of the light source and the first micro-lens array.

LC gratings also allow multiple stripes, i.e. more than two segments of a collimation lens array, to be illuminated simultaneously. Moreover, the intensity can be varied locally within a stripe.

Since the scanning steps are discrete, switchable PDLC volume gratings can be used as well to illuminate selected segments of an illumination device in order to minimise absorption losses in scanning illumination devices.

Further, polarisation gratings combined with switchable retardation plates which turn the polarisation plane can be used as well. Still further, it is possible for example to use a set of polarisation-switching polarisation gratings, where the gratings show the same intensity in the positive and negative first diffraction order.

Still further, a minimisation of the absorption losses can be achieved by using angle division multiplex volume gratings. Since the scanning steps are discrete and specifiable, angle division multiplexing can be used in conjunction with angle-selective volume gratings in order to realise a scanning illumination device.

The first diffraction grating of FIG. 15 is of a switchable type, and the second diffraction grating, which is disposed upstream of the first micro-lens array of the light collimation unit, can for example be provided in the form of an angle-selective volume grating, where this angle-selective volume grating serves to realise the required deflection angles for at least one light wavelength with the help of a firmly inscribed diffractive structure.

The first diffraction grating of FIG. 15 can also be designed in the form of a switchable PDLC grating stack, where the second grating of FIG. 15, which is disposed upstream of the first micro-lens array of the light collimation unit, is designed in the form of a volume grating which exhibits the necessary deflection geometries, which are designed such that the light which hits the grating at an angle that increases as the distance of the arrangement to the optical axis becomes larger is diffracted again into a direction that is parallel to the optical axis.

The diffraction geometry can be exclusively space division multiplexed. This means that the second grating of FIG. 15 can simply be a volume grating which has for example ten spatially separated strip-shaped segments with diffraction gratings having different optical properties, said diffraction gratings diffracting the light which impinges on them at an increasingly oblique angle as the distance to the optical axis becomes larger to be parallel to the optical axis, depending on the wavelength RGB. This grating can for example also have a stripe in its centre where no volume grating is inscribed at all, so that incident light is transmitted without being diffracted.

Besides optical paths in the light collimation unit which run symmetrical to the optical axis, as is the case in the example shown in FIG. 15, oblique optical paths can be realised as well with a symmetry axis that lies at an oblique angle to the optical axis of the light collimation unit. In such an off-axis arrangement, the intensity of the $0^{th}$ diffraction order of the gratings used in that arrangement is uncritical, because it is guided away from the optical path that runs parallel to the optical axis.

The working principle which is illustrated for example in FIG. 15 can be extended to 2D scanning in that a second arrangement of gratings which has the same design but which is turned by 90° relative to the first one is disposed downstream the first one. In addition, local dimming is possible, in particular also with LC-based gratings, or with a light collimation unit that is extended to 2D scanning. Since fibre-optic switches operate much faster than LC gratings, arrangements which use fibre-optic switches have greater response time reserves in applications where scanning and local dimming are combined.

Figure 16:
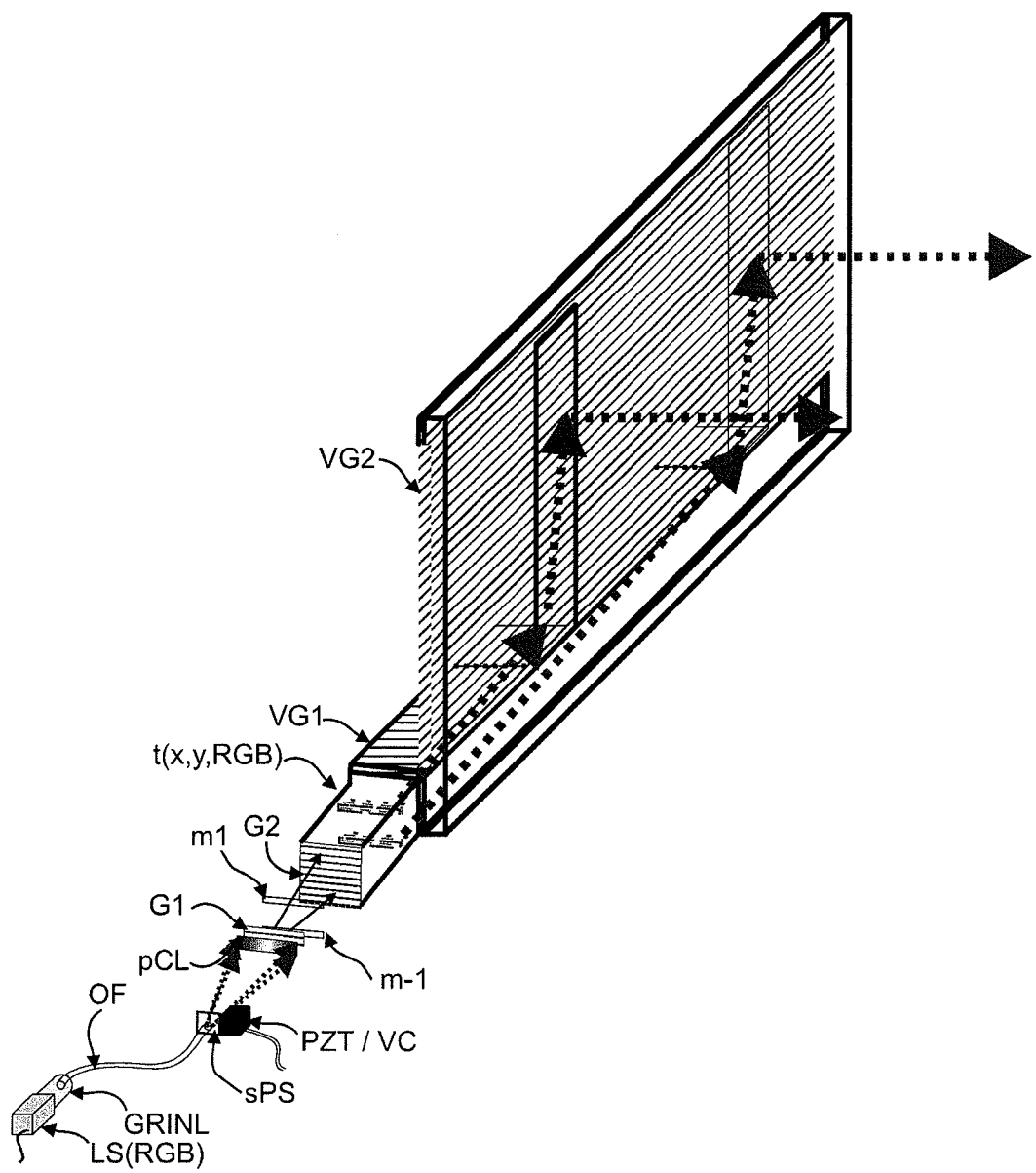
FIG. 16 shows an embodiment of a scanning illumination device with a light collimation unit which makes it possible to directly illuminate the entry surface of a subsequently arranged enlarging unit according to FIG. 11 with strip-shaped illumination regions with the help of two LC grating according to FIG. 15.

According to a preferred embodiment, the arrangement shown in FIG. 15, which allows selected regions of a collimation lens array of a light collimation unit which is disposed downstream to be illuminated with the help of two diffraction gratings G1 and G2, can also be used instead of the light collimation unit of the arrangement shown in FIG. 11 of a scanning illumination device with subsequent anamorphic enlargement of the wave field that occurs at the exit of the light collimation unit. This is shown in FIG. 16.

The major advantage of this embodiment of a scanning illumination device is its greater luminous efficacy, because no light-absorbing shutter is needed to generate the strip-shaped illuminating regions. Referring to FIG. 16, the strip-shaped illuminating regions which are generated by the two controllable diffraction gratings G1 and G2 are enlarged directly by the enlarging unit which is disposed downstream and which comprises the diffraction gratings VG1 and VG2. The reference symbols used to denote the individual components are basically the same as in FIGS. 11 and 15. The reference symbols m1 and m−1 relate to the first and—symmetrical—minus first diffraction order of a first controllable diffraction grating G1, seen in the direction of light propagation, which occur as strip-shaped illuminating regions t(x,y,RGB) for the three colours RGB downstream of the second diffraction grating G2, as shown in FIG. 11, and which are thereafter enlarged.

The scanning and dimming solutions for illumination devices shown here, which allow efficient use of the energy emitted by the primary laser light sources, are just examples of a much wider range of possibilities.

Light diffracting volume gratings can preferably also be used to filter the angular spectrum of plane waves of the illumination in addition to deflecting the light, as is necessary e.g. in autostereoscopic and holographic 3D displays which require compliance with a certain angle tolerance of the angular spectrum of plane waves.

The starting point here is an illuminated area having the size of the display, such as the exit surface of a scanning illumination device.

The light source can for example be a fibre matrix which has output coupling points for secondary light sources. The fibre matrix and/or the output coupling points can be designed such that the exit of light is controllable such that at least two regions are formed which can be switched on and off separately. The transition between the regions can also be designed in the form of a temporally smoothened intensity transition which serves to circumvent a flickering sensation to the observer.

The light beams which leave the fibre matrix are collimated by a primary lens array. The lateral extent of the output coupling points of the fibre matrix are adapted to the size of the collimation lenses of the lens array such that after transmission through the lenses there is an angular spectrum of plane waves of for example 1/20° in one direction while it measures about 1° in the perpendicular direction. This means that with the same numeric aperture of the lenses in the considered directions an individual secondary light source is 20 times as wide as high. The secondary light sources of the fibre matrix are thus rod-shaped.

Figure 17:
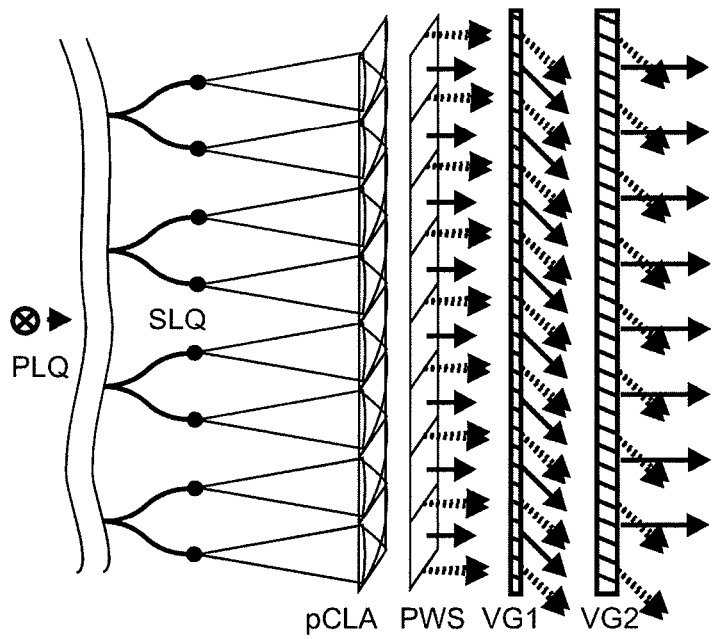
FIG. 17 illustrates the angular filtering effect of a combination of two volume gratings VG1 and VG2.

FIG. 17 shows the entry section of such an illumination device, which works as a scanning illumination device. The light emitted by a primary light source PLQ is distributed to a number of switchable paths such that the secondary light sources SLQ can be switched at least in groups. Segments of collimated light are emitted by the lens array L, where the angular spectrum of plane waves of these segments is determined by the size of the secondary light sources. The desired target angular spectrum of plane waves is broadened by way of diffraction at the edges of the lenses of the collimation lens array which is disposed downstream. If individual collimation lenses of the lens array have a size of 3 mm×3 mm to 5 mm×5 mm, this may possibly—in addition to an undesired diffraction broadening of the desired angular spectrum of plane waves—also be perceived as an intensity modulation on the display which is illuminated with this illumination device.

This problem can for example be solved by way of angular filtering of the wave field which exists downstream of the lens array which collimates the light of the secondary light sources. This can be achieved in that for preventing the broadening of the angular spectrum of plane waves through diffraction at the edges of the lenses of the primary collimation lens array the latter is followed in the direction of light propagation by a combination of two volume gratings for angular filtering, as is illustrated in FIG. 17. The first volume grating VG1 is rather thin (thickness d is e.g. ≤10 µm), thus exhibiting a broad angular and wavelength selectivity. 'Broad' here means that the volume grating diffracts plane waves in a larger angular range. For example, if the reconstruction geometry of the first volume grating VG1, which is made of a plastic material or glass, is 0°/−45°, then an angular spectrum of the plane waves of for example ±4° is diffracted by an angle which corresponds with an angle of total internal reflection.

The second volume grating VG2 is rather thick, i.e. its thickness d is ≥200 µm. It is made of a plastic material or glass and has a reconstruction geometry of for example −45°/0°. The thickness of the grating causes a narrow angular selectivity, which is of such nature that only those incident light beams which lie inside the given angular spectrum of plane waves are diffracted towards the optical axis of the arrangement, while the light beams which propagate outside that angular spectrum of plane waves are transmitted without being diffracted. The major part of the angular spectrum of plane waves which is broadened through diffraction at the edges of the lenses is thus guided out of the useful optical path. The angular spectrum of plane waves thus has the desired form downstream of the second volume grating VG2.

An illumination device for a direct-view display which has an angular spectrum of plane waves which is limited to ≤1/20° at least in one direction can be created this way using a collimation lens array instead of a single, large-area collimation lens.

The direct-view illumination device described here can for example be used in holographic 3D displays which take advantage of a one-dimensional holographic encoding method.

If a two-dimensional holographic encoding method is used, then the process of angular filtering according to the procedure described above can be performed a second time, where for angular filtering of the angular spectrum of plane waves in two perpendicular directions a second combination of volume gratings which is turned by 90° relative to the first one is disposed downstream of the first one in order to realise the desired angular spectrum of plane waves of for example ≤1/20° in two directions.

The illumination devices for transmissive light modulators (backlight units BLU) described above can generally also be modified such to illuminate reflective light modulators (frontlight units FLU). When doing so, one problem is to keep apart the light which illuminates the reflective light modulator and the modulated light which is reflected by it.

A first option is to separate the light which illuminates the reflective light modulator and the modulated light which is reflected by it polarisation-wise. For example, the illumination device which is shown in FIG. 11 can be supplemented by a retardation plate, in particular a λ/4 plate, which is disposed downstream of the two-dimensional volume grating in the direction of light propagation (not shown). If for example horizontal linear polarised light falls on a λ/4 plate, then it will leave the plate having a circular polarisation. A reflective light modulator (not shown) which is disposed downstream in the optical path reflects the modulated circular polarised light back towards the λ/4 plate; after having passed through this plate again, it exhibits vertical polarisation. This vertical polarised light can now pass through the volume grating unimpeded and it can be perceived by an observer who is situated in front of the volume grating (not shown).

Figure 18:
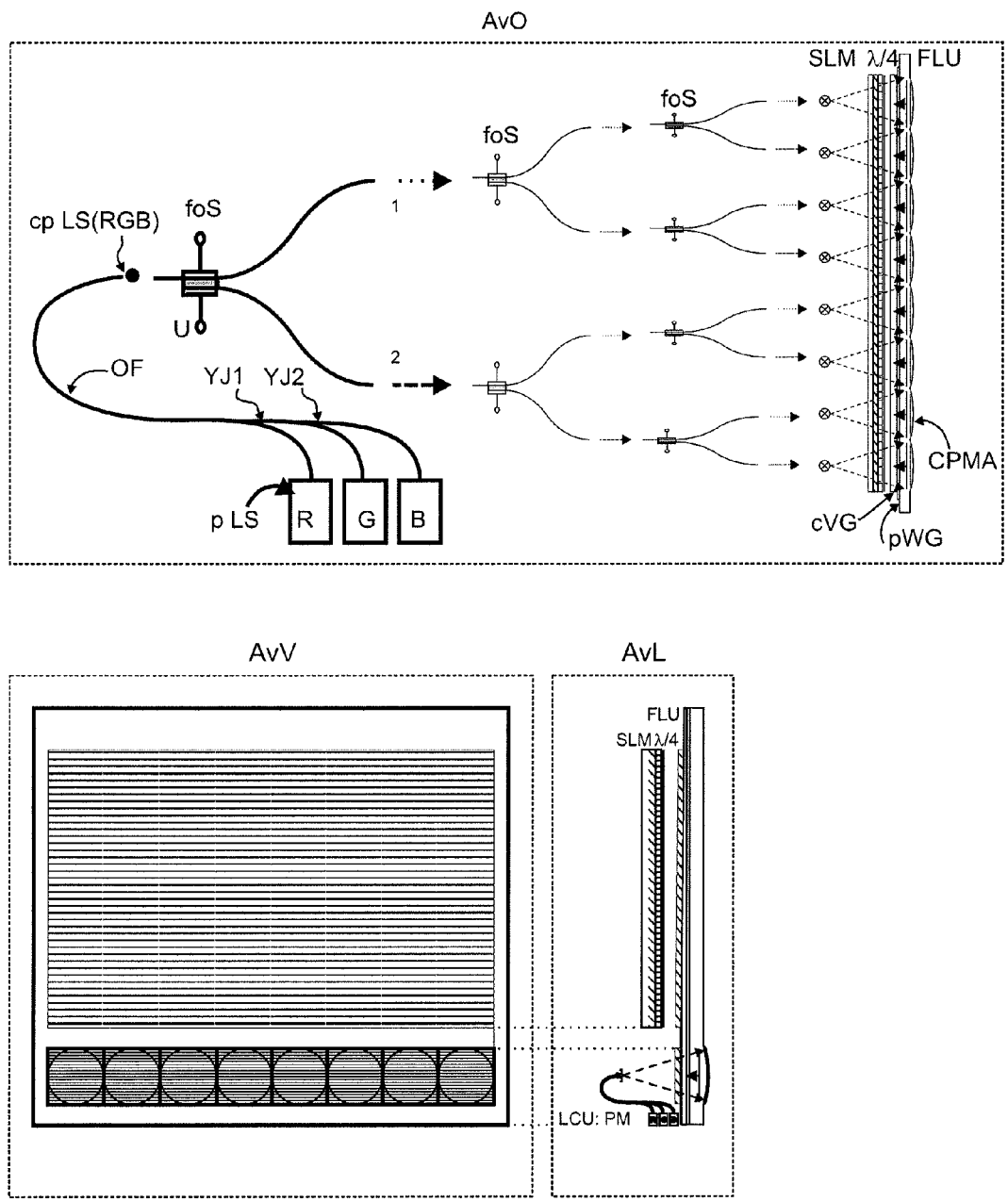
Figure 18:
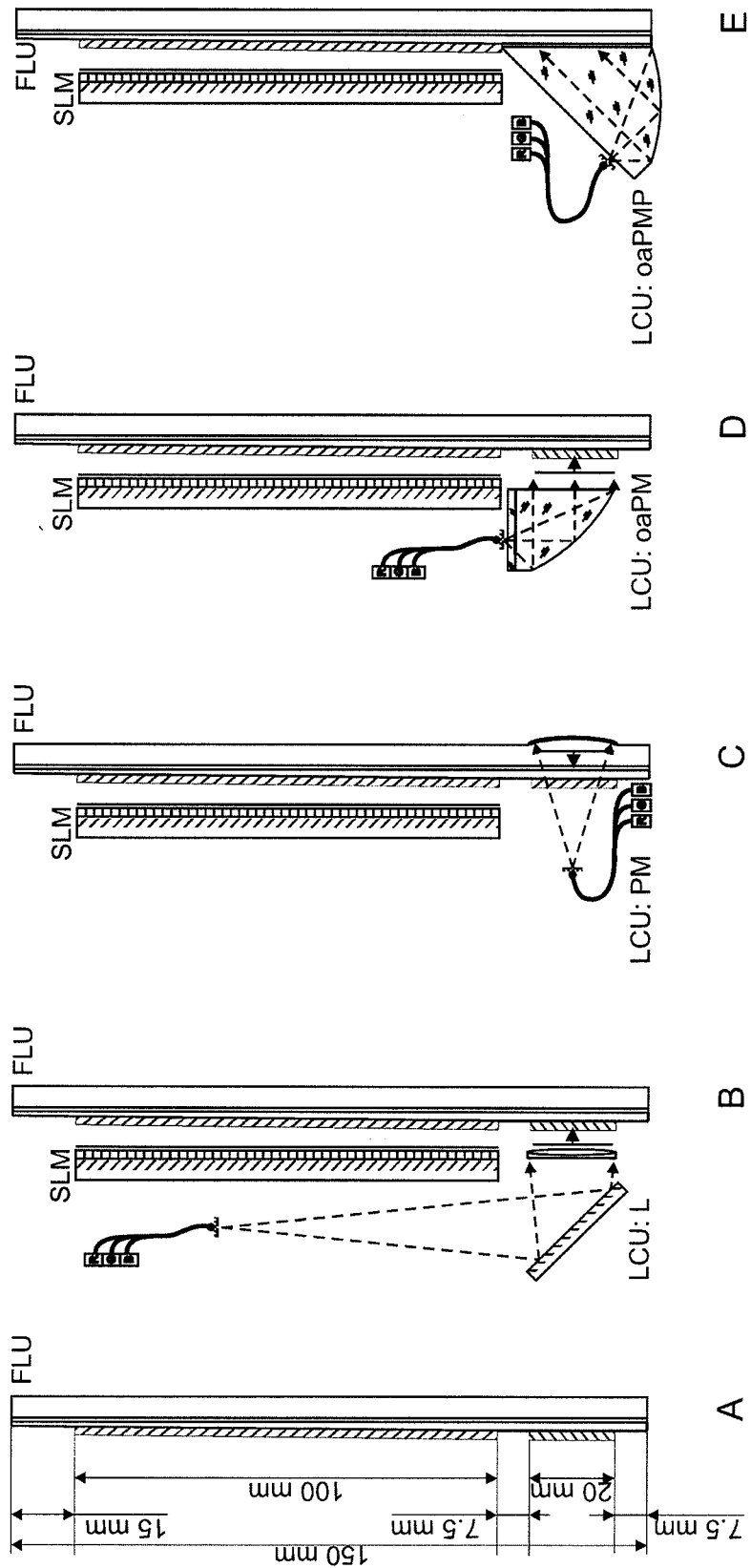

Another possibility of separating the illuminating light from the modulated and reflected light is to take advantage of the angular selectivity of a light deflecting element, such as a volume diffraction grating. A corresponding arrangement is illustrated in FIG. 18a. It shows an illumination device in the form of a frontlight unit FLU for a reflective light modulator, where a cascade of fibre-optic switches illuminates selectable parabolic mirrors of a collimating parabolic mirror array CPMA). The light which is collimated by the parabolic mirrors is coupled into a plane light waveguide pWG through a coupling volume grating cVG and distributed across its entire entry surface.

For example, if a transmissive volume grating of sufficient thickness is used and if the light modulator is illuminated at a sufficiently oblique angle, i.e. for example 5° deg, then there is an 'off-Bragg' illumination of the volume grating on the way back from the reflective light modulator, and this volume grating which is used to illuminate the light modulator thus has no diffracting function. This way, the optical paths towards the light modulator and back from it can be kept apart. This method allows to do without the λ/4 plate shown in FIG. 18a, which can for example be of an apochromatic type. The latter would only be necessary if the separation of the illuminating light from the light that is modulated and reflected by the light modulator was achieved by using different polarisations.

FIG. 18b shows further embodiments of line-shaped light collimation units for injecting the light through volume gratings into plane waveguides according to FIG. 18a to scale. The reference symbols used in the individual options have the following meanings:
    FLU: frontlight unit
    LCU: light collimation unit
    Option B: L: lens, classic collimation (as described above)
    Option C: PM: parabolic mirror (option with least length)
    Option D: oaPM: off-axis parabolic mirror
    Option E: oaPMP: off-axis parabolic mirror prism.

An input coupling volume grating which serves to inject an incident plane wave into the core of the waveguide is always accommodated at the lower end of the plane waveguide of the illumination device for reflective light modulators. Given a sufficient thickness, the angular selectivity is sufficiently narrow for a spherical light wave which passes through this volume grating to be transmitted almost without being diffracted. This can be taken advantage of in order to minimise the size of the light collimation unit. This is illustrated in the left view in FIG. 18a, where a row of collimating parabolic mirrors is disposed downstream of the input coupling grating and serves to collimate the spherical waves which leave the row of fibre ends as secondary light sources. The input coupling volume grating is dimensioned such that the plane waves which are reflected by the parabolic mirrors are coupled into the plane waveguide. This is also illustrated in embodiment C shown in FIG. 18a. This embodiment is the shortest of all.

The other embodiments require somewhat more space and relate to classic collimation using a lens (option B) and to a collimation using a parabolic mirror that is situated off-axis (option D) or using a combination of a parabolic mirror and a prism (option E).

The off-axis parabolic mirror prism shown in option E simultaneously serves as a collimator and input coupling prism, so that no volume grating is needed for injecting the light into the plane waveguide.

This invention shall not be limited to the embodiments described herein and can be employed in the broadest sense to realise large-area displays having little depth whether they use holographic or autostereoscopic or mixed methods for image generation.

Finally, it must be said that the embodiments described above shall solely be understood to illustrate the claimed teaching, but that the claimed teaching is not limited to these embodiments.

The invention claimed is:
1. A holographic display comprising an illumination device, an enlarging unit and a light modulator, wherein:
    the illumination device comprises at least one light source and a light collimation unit, the light collimation unit collimating the light of the at least one light source and generating a light wave field of the light that is emitted by the light source with a specifiable angular spectrum of plane waves, where the light collimation unit comprises deflection geometries which are designed such that light incident on the light collimation unit at an angle that increases as the distance of the arrangement to the optical axis becomes larger is directed into a direction parallel to the optical axis, depending on the wavelength RGB;
    the enlarging unit is disposed downstream of the light collimation unit, seen in the direction of light propagation, the enlarging unit comprising a transmissive volume hologram realising an anamorphic broadening of the light wave field due to a transmissive interaction of the light wave field with the volume hologram; and the light modulator is disposed upstream or downstream of the anamorphic enlarging unit, seen in the direction of light propagation.

2. The holographic display according to claim 1, wherein the light wave field coming from the light collimation unit hits the volume hologram at a specifiable angle of incidence, which is not smaller than 70°.

3. The holographic display according to claim 1, wherein the thickness of the volume hologram is chosen such that the light wave field comprises an angular distribution of wave vectors and that the maximum deviation of the angle distribution of wave vectors of the light wave field does not exceed a value of $\frac{1}{20}°$ in at least one direction.

4. The holographic display according to claim 1, wherein the difference in optical path length z(x, y) of the light beams of the enlarged light wave field between two defined points on the light modulator does not exceed a predetermined value on the encoding surface of the light modulator at a given coherence length of the light so that the difference in optical path length is small enough that said light beams of the enlarged light wave field are still capable of generating interference.

5. The holographic display according to claim 1, wherein the enlarging unit comprises a further volume hologram, which is disposed downstream of the volume hologram, seen in the direction of light propagation, and where the volume holograms of the enlarging unit are designed and disposed such that the light is deflected into two different directions, where the light modulator is disposed upstream or downstream of the further volume hologram, seen in the direction of light propagation.

6. The holographic display according to claim 5, wherein the light collimation unit is followed in the direction of light propagation by two volume holograms such that they anamorphically broaden the light wave field with the defined angular spectrum of plane waves in two substantially perpendicular directions.

7. The holographic display according to claim 6, wherein the volume hologram is an off-axis volume hologram.

8. The holographic display according to claim 5, wherein one of the volume holograms is designed such that it has the function of a field lens, in addition to its function as an enlarging element.

9. The holographic display according to claim 1, wherein the light source comprises a laser, laser diode, LED or OLED.

10. The holographic display according to claim 1, wherein a beam combiner is provided for combining the light of the at least one light source into a common optical fibre.

11. The holographic display according to claim 1, wherein the light collimation unit comprises a primary collimation lens.

12. The holographic display according to claim 11, wherein the light collimation unit comprises a first micro-lens array which is illuminated by a collimated light wave field.

13. The holographic display according to claim 12, wherein a scattering device is disposed in a focal plane of the first micro-lens array, from which the light propagates to a first aperture stop which is situated immediately downstream of it.

14. The holographic display according to claim 13, wherein the apertures of the first aperture stop have asymmetric lateral extents in order to generate an angular spectrum of plane waves of the light wave field with specifiable coherence properties with regard to the respective lateral extent.

15. The holographic display according to claim 14, wherein the apertures of the first aperture stop of the light collimation unit are dimensioned such that the coherence properties of the light wave field differ in two different directions such that the radiation is incoherent in the one direction, whereas it is sufficiently coherent in the other.

16. The holographic display according to claim 13, wherein a second micro-lens array is disposed downstream of the first aperture stop in the direction of light propagation such that the apertures of the first aperture stop coincide with the rear focal points of the corresponding micro-lenses of the second micro-lens array.

17. The holographic display according to claim 16, wherein two further aperture stops are disposed between the first aperture stop and the second micro-lens array.

18. The holographic display according to claim 16, wherein the second micro-lens array generates a segmented light wave field with an angular spectrum of plane waves with which a following light modulator which carries a holographic code is illuminated either directly or after lateral enlargement of the light wave field.

19. The holographic display according to claim 12, wherein a shutter is disposed upstream of the first micro-lens array of the light collimation unit, seen in the direction of light propagation, where the transparency of multiple strip-shaped segments which run in the vertical or horizontal direction is controllable.

20. The holographic display according to claim 19, wherein two strip-shaped segments of the illuminating light are switched on, respectively, which run vertically in the plane of the light modulator and which are movable time-sequentially in the horizontal or vertical direction between the edge of the light modulator and its centre.

21. The holographic display according to claim 12, wherein selected lenses of a primary collimation lens array which is disposed upstream of the first micro-lens array of the light collimation unit are illuminated by a cascade of fibre-optic light sources which are switchable by fibre-optic switches.

22. The holographic display according to claim 21, wherein passive light exits are provided at the ends of optical multi-mode fibres for illuminating selectable lenses of a primary collimation lens array which is disposed upstream of the first micro-lens array of the light collimation unit.

23. The holographic display according to claim 21, wherein selected segments of the first micro-lens array of the light collimation unit are illuminatable by a combination of two switchable LC-based diffraction gratings, which are disposed between a primary collimation lens that is situated downstream of the light source and the first micro-lens array, where the intensity of the strip-shaped segments could be locally variable.

24. The holographic display according to claim 23, wherein the combination of two switchable LC-based diffraction gratings is disposed between a primary collimation lens that is situated downstream of the light source and the entry surface of the anamorphic enlarging unit and generates two scanning strip-shaped illuminating regions which are enlarged directly by the enlarging unit.

25. The holographic display according to claim 23, wherein the switchable diffraction gratings are PDLC volume gratings or polarisation gratings combined with switchable retardation plates.

26. The holographic display according to claim 23, wherein the diffraction gratings, which are disposed between the primary collimation lens of the light source and the first micro-lens array of the light collimation unit, are designed such that off-axis optical paths are realisable as well, in order to eliminate the 0th diffraction order of the gratings from the used optical path.

27. The holographic display according to claim 23, wherein the diffraction gratings, which are disposed between the primary collimation lens of the light source and the first micro-lens array of the light collimation unit, are designed such that an illumination of multiple surface regions of the first micro-lens array of the light collimation unit is realisable in the horizontal and vertical direction.

28. The holographic display according to claim 27, wherein for preventing the broadening of the angular spectrum of plane waves through diffraction at the edges of the lenses of the primary collimation lens array the latter is followed in the direction of light propagation by a combination of two volume gratings for angular filtering.

29. The holographic display according to claim 27, wherein the combination of volume gratings for angular filtering of the angular spectrum of plane waves comprises a first, thin volume grating with a wide angular selectivity and a large diffraction angle deviating from the optical axis and a second, thick volume grating with a narrow angular selectivity which is designed such that the light beams which are incident in the region of the given angular spectrum of plane waves are diffracted along the optical axis of the arrangement and that the light beams which propagate outside the angular spectrum of plane waves are transmitted without diffraction.

30. The holographic display according to claim 27, wherein a second combination of volume gratings, which is turned by 90° relative to the first combination of volume gratings, is disposed downstream of the first combination of volume gratings to be able to realise an angular filtering of the angular spectrum of plane waves in two perpendicular directions.

31. The holographic display according to claim 21, wherein selected segments of the first micro-lens array of the light collimation unit are illuminatable by a combination of two diffraction gratings, where the first diffraction grating is of a switchable type and where the second diffraction grating is disposed upstream of the first micro-lens array and designed in the form of an angle-selective volume grating, where this angle-selective volume grating serves to realise the required deflection angles for at least one light wavelength with the help of a fixed inscribed diffractive structure.

32. The holographic display according to claim 21, wherein selected segments of the first micro-lens array of the light collimation unit are illuminatable by a combination of two diffraction gratings, where the first diffraction grating is of a switchable type and where the second diffraction grating is disposed upstream of the first micro-lens array and designed in the form of a volume grating, where the volume grating comprises multiple strip-shaped segments which are designed such that the light which hits the strip-shaped segments at an angle that increases as the distance to the optical axis of the arrangement becomes larger is diffracted into a direction that is parallel to the optical axis.

33. The holographic display according to claim 21, wherein the lenses of the primary collimation lens array, which is disposed upstream of the first micro-lens array of the light collimation unit are illuminated by segmented plane waves whose angular spectrum comprises an angular deviation of about $1/20°$ in one direction and of about 1° in the perpendicular direction.

34. The holographic display according to claim 21, wherein the light modulator is of a reflective or transflective type and/or where the illumination device is designed and supplemented by optical components which modify the polarisation of the light such that the illumination device illuminates the active area of the reflective or transflective light modulator with light of a specifiable polarisation.

35. The holographic display according to claim 34, wherein the light modulator is of a reflective or transflective type and/or where the illumination device is designed and supplemented by line-shaped light collimation units which collimate the light which is emitted by a line arrangement of switchable secondary light sources and couple it into a plane waveguide either directly or through angle-selective deflection elements.

36. The holographic display according to claim 21, wherein the light modulator is of a reflective or transflective type and/or where the illumination device is designed and supplemented by plane waveguides combined with angle-selective deflection elements such that the light diffracting function of the deflection element will only be effective when light is coupled into the waveguide and when the light is coupled out to illuminate the light modulator, but not when light which is modulated and reflected by the light modulator is on its way back.

37. The holographic display according to claim 1, wherein the primary collimation lens is followed in the direction of light propagation by an angular filter in the form of a volume hologram whose thickness is chosen such that the light wave field comprises an angular distribution of wave vectors and that the maximum deviation of the angle distribution of wave vectors of the light wave field does not exceed a value of $1/20°$ in at least one direction.

38. The holographic display according to claim 1, wherein the light modulator is of a transmissive, reflective or transflective type and/or where the illumination device is designed and dimensioned such that it illuminates the active area of the light modulator substantially homogeneously.

39. The holographic display according to claim 1, wherein at least one parameter of the light collimation unit is modifiable in order to generate a specifiable angular spectrum of plane waves of the light wave field downstream of the at least one volume hologram.

40. The holographic display according to claim 1, wherein the at least one volume hologram is designed such that it suppresses disturbing portions of radiation or diffraction orders for an observer who looks at the display.

41. The holographic display according to claim 1, wherein the light collimation unit has a line structure, where a line has at least two light sources which can be switched independently of each other and, at the exit, at least two collimating refractive lenses, and where these lines are arranged side by side along an edge of a subsequently arranged two-dimensional enlarging unit such that they illuminate the entire surface of the latter.

42. The holographic display according to claim 41, wherein a wedge-shaped light waveguide device is provided for illuminating a two-dimensional enlarging unit which comprises a volume grating, wherein the volume grating is attached to the side of the wedge-shaped light waveguide device which is situated substantially perpendicular to its light entry surface and serves to enlarge the segmented plane wave field which is emitted by the light collimation unit and to direct it at the surface of a light modulator which is disposed further downstream.

43. The holographic display according to claim 41, wherein depending on the number of lines which are arranged side by side in the light collimation unit and the number of light sources which can be switched independently of each other in each line, the thus formed illumination device has a matrix of independently switchable illumination segments.

* * * * *